United States Patent
Xu et al.

(10) Patent No.: US 11,758,588 B2
(45) Date of Patent: Sep. 12, 2023

(54) INTERFERENCE MANAGEMENT IN WIRELESS SYSTEMS

(71) Applicant: ZTE Corporation, Guangdong (CN)

(72) Inventors: Hanging Xu, Guangdong (CN); Mengzhu Chen, Guangdong (CN); Jun Xu, Guangdong (CN); Yajun Zhao, Guangdong (CN); Saijin Xie, Guangdong (CN)

(73) Assignee: ZTE Corporation, Guangdong (CN)

( * ) Notice: Subject to any disclaimer, the term of this patent is extended or adjusted under 35 U.S.C. 154(b) by 0 days.

(21) Appl. No.: 17/185,506

(22) Filed: Feb. 25, 2021

(65) Prior Publication Data

US 2021/0185726 A1  Jun. 17, 2021

Related U.S. Application Data

(63) Continuation of application No. PCT/CN2018/113761, filed on Nov. 2, 2018.

(51) Int. Cl.
*H04W 74/08* (2009.01)
*H04L 27/26* (2006.01)
(Continued)

(52) U.S. Cl.
CPC ....... *H04W 74/085* (2013.01); *H04L 27/2666* (2013.01); *H04W 74/008* (2013.01); *H04W 88/14* (2013.01); *H04W 92/10* (2013.01)

(58) Field of Classification Search
CPC ........... H04W 74/085; H04W 74/0841; H04W 74/008; H04W 52/243; H04W 24/10; H04W 88/14; H04W 88/08; H04W 92/10; H04W 92/02; H04L 27/2666; H04J 2211/005; H04J 11/0023; H04J 11/0056; H04J 13/0022; H04B 17/345;
(Continued)

(56) References Cited

U.S. PATENT DOCUMENTS 6,304,760 B1  10/2001  Thomson et al.
2010/0099449 A1*  4/2010  Borran ............... H04W 52/243
                                                        455/501

(Continued)

FOREIGN PATENT DOCUMENTS

CN  102356659  2/2012
CN  103210598  7/2013
(Continued)

OTHER PUBLICATIONS

LG Electronics, NR-RIM intereference signal, Oct. 2018, 3GPP R1-1810292 (Year: 2018).*

(Continued)

*Primary Examiner* — Sudesh M Patidar
(74) *Attorney, Agent, or Firm* — Perkins Coie LLP

(57) ABSTRACT

Techniques for interference mitigation in a wireless communication system are disclosed. One example method includes receiving, at a first communication node, interference status information indicative of a remote interference between the first communication node and a second communication node and performing, by the first communication node, subsequent communications to the second communication node by implementing a backoff based on a granularity.

6 Claims, 11 Drawing Sheets

(51) Int. Cl.
*H04W 74/00* (2009.01)
*H04W 88/14* (2009.01)
*H04W 92/10* (2009.01)

(58) Field of Classification Search
CPC ........ H04B 17/309; H04B 15/00; H04B 7/24; H04B 1/69; H04B 2001/6904
See application file for complete search history.

(56) References Cited

U.S. PATENT DOCUMENTS

| | | | | |
|---|---|---|---|---|
| 2010/0120367 | A1* | 5/2010 | Nanda | H04B 7/024 455/63.1 |
| 2013/0322289 | A1 | 12/2013 | Zhu et al. | |
| 2014/0056190 | A1* | 2/2014 | Qian | H04W 24/02 370/280 |
| 2014/0120967 | A1 | 5/2014 | Purnadi et al. | |
| 2015/0131631 | A1* | 5/2015 | Chen | H04W 48/00 370/336 |
| 2016/0338050 | A1 | 11/2016 | Kim et al. | |
| 2018/0076917 | A1 | 3/2018 | Pan et al. | |
| 2018/0124636 | A1 | 5/2018 | Ly et al. | |
| 2019/0207798 | A1* | 7/2019 | Wang | H04L 5/0092 |
| 2020/0044764 | A1* | 2/2020 | Xu | H04W 24/08 |
| 2020/0374874 | A1* | 11/2020 | Ke | H04L 5/0073 |
| 2021/0274511 | A1* | 9/2021 | Cao | H04W 72/082 |
| 2021/0306878 | A1* | 9/2021 | Jin | H04L 5/0048 |
| 2021/0307020 | A1* | 9/2021 | Baldemair | H04J 11/0056 |
| 2021/0321268 | A1* | 10/2021 | Ly | H04J 11/0056 |
| 2021/0352509 | A1* | 11/2021 | Sundberg | H04W 24/10 |
| 2021/0352554 | A1* | 11/2021 | Barac | H04W 36/06 |
| 2021/0368510 | A1* | 11/2021 | Xia | H04W 24/08 |
| 2021/0400676 | A1* | 12/2021 | Faxér | H04W 72/0446 |

FOREIGN PATENT DOCUMENTS

| | | |
|---|---|---|
| CN | 104956716 | 9/2015 |
| CN | 108259112 A | 7/2018 |
| WO | 2009046330 | 4/2009 |
| WO | 2016192590 A1 | 12/2016 |
| WO | 2020/067989 | 4/2020 |

OTHER PUBLICATIONS

International Search Report and Written Opinion in International Application No. PCT/CN2018/113761, dated Jul. 25, 2019, 8 pages.
Co-Pending EP Application No. 18930067.6, filed Nov. 2, 2018, Extended Search Report dated Apr. 29, 2022, 15 pages.
CMCC "Discussion on RS design for RIM," 3GPP TSG RAN WG 1 Meeting #94 Gothenburg, Sweden, Aug. 20-24, 2018, R1-1808842, 12 pages.
Ericsson "On encoding of gNB set ID in RIM-RS" 3GPP TSG-RAN WG1 Meeting #94bis Chengdu, China, Oct. 8-12, 2018, Tdoc R1-1811439, 6 pages.
Hisense, "Discussion on procedure for RIM framework" 3GPP TSG RAN WG1 Meeting #94bis ChengDu, China, Oct. 8-12, 2018, R1-1811419, 4 pages.
Qualcomm, "Mechanisms for identifying strong gNB interferers" 3GPP TSG RAN WG1 Meeting #94-Bis, Chengdu, China, Oct. 8-12, 2018, R1-1811271, 4 pages.
ZTE, "Consideration on RIM framework and mechanisms for improving network robustness" 3GPP TSG RAN WG1 Meeting #94 Gothenburg, Sweden, Aug. 20-24, 2038, R1-1808325, 7 pages.
Co-Pending Indian Patent Application, First Examination Report for IN Appl. No. 202147012270, dated Apr. 7, 2022, 6 pages.
Co-Pending Chinese Patent Application, First Office Action for CN Appl. No. 2018800900101.5, dated Feb. 22, 2022, 14 pages with unofficial translation.
Co-Pending Japanese Patent Application, Office Action for JP Appl. No. 2021-523638, dated Apr. 25, 2022, 4 pages with unofficial translation.
ZTE "Consideration on mechamsm for identifying strong gNS interference," R1-1810332, 3GPP TSG RAN WG1 Meeting #94bis Chengdu, China, Oct. 8-12, 2018, 7 pages.
ZTE, "Discussion on reference signal for RIM," 3GPP TSG RAN WG1 Meeting #95, R1-1812441, Spokane, USA, Nov. 12-16, 2018, 9 pages.
European Search Report for EP Patent Application No. 19849276.1, dated Jan. 5, 2022, 8 pages.
ZTE, "Discussion on RIM mechamsms for improving network robustness," 3GPP TSG RAN WG1 Meeting #95, R1-1812440, Spokane, USA, Nov. 12-16, 2018, 13 pages.
3rd Generation Partnership Project; Technical Specification Group Radio Access Network; Study on remote interference management for NR (Release 16), 3GPP TR 38.866, V16.0.0, (Dec. 2018), 11 pages.
International Search Report and Written Opinion in International Application No. PCT/CN2019/071448, dated Oct. 10, 2019, 7 pages.
Article 94 Communication for co-pending EP Patent Application No. 19849276.1, dated Mar. 17, 2023, 4 pages.
Article 94 Communication for co-pending EP Patent Application No. 19849276.1, dated 4 pages.
Article 94 Communication for co-pending EP Patent Application No. 19849276.1, dated Jul. 6, 2023, 5 pages.

\* cited by examiner (a)OFDM baseband signal generation method-1 for Alt-2

(b)OFDM baseband signal generation method-2 for Alt-2

(c)OFDM baseband signal generation method-3 for Alt-3

(d)OFDM baseband signal generation method-4 for Alt-3

(a)Frequency (b)OFDM symbol (a)Frequency (b)OFDM symbol (a) OFDM baseband signal generation method-1 for two-symbol RS (b) OFDM baseband signal generation method-2 for two-symbol RS (a) RS transmission periodicity = UL-DL pattern periodicity (b) RS transmission periodicity > UL-DL pattern periodicity (c) RS transmission periodicity > UL-DL pattern periodicity (d) RS transmission periodicity > UL-DL pattern periodicity Seq-1    Seq-2

INTERFERENCE MANAGEMENT IN WIRELESS SYSTEMS

CROSS-REFERENCE TO RELATED APPLICATIONS

This application is a continuation of International Patent Application No. PCT/CN2018/113761, filed on Nov. 2, 2018, the contents of which are incorporated herein by reference in their entirety.

TECHNICAL FIELD

This patent document is directed generally to wireless communications.

BACKGROUND

Mobile communication technologies are moving the world toward an increasingly connected and networked society. The rapid growth of mobile communications and advances in technology have led to greater demand for capacity and connectivity. Other aspects, such as energy consumption, device cost, spectral efficiency, and latency are also important to meeting the needs of various communication scenarios. Various techniques, including new ways to provide higher quality of service, longer battery life, and improved performance are being discussed.

SUMMARY

This patent document describes, among other things, techniques for managing remote interferences caused by phenomena such as the atmospheric ducting phenomenon. The disclosed techniques allow wireless communication nodes to effectively mitigate such interference without negatively impacting the system performance.

In one example aspect, a wireless communication method is disclosed. The method includes receiving, at a first communication node, interference status information indicative of a remote interference between the first communication node and a second communication node, and performing, by the first communication node, subsequent communications to the second communication node by implementing a backoff based on a granularity.

In another example aspect, another method of wireless communication is disclosed. The method includes transmitting, by a first communication node, a first reference signal indicative of presence of remote interference between the first communication node and a second communication node, wherein time domain positions of the first reference signal includes one of a last symbol before a maximum downlink transmission boundary for transmissions between the first communication node and the second communication node, or an Nth symbol prior to the transmission boundary, where N is an integer greater than 1.

In yet another example aspect, a method of wireless communication is disclosed. The method includes transmitting, by a first communication node, a first reference signal indicative of presence of remote interference between the first communication node and a second communication node, wherein the first reference signal is transmitted in preconfigured time periods and wherein the first reference signal is transmitted at multiple occasions in each time period and communicating an ID information associated with the first communication node using the first reference signal.

In yet another example aspect, a wireless communication method is disclosed. The method includes transmitting, from a first communication node, a first reference signal related to a first interference on an inbound channel to the first communication node and a second reference signal related to a second interference on an outbound channel from the first communication node. The first reference signal and the second reference signal are transmitted in a non-overlapping manner.

In yet another example aspect, a wireless communication apparatus is disclosed. The apparatus includes a processor that is configured to implement an above-described method.

In yet another example aspect, a computer-program storage medium is disclosed. The computer-program storage medium includes code stored thereon. The code, when executed by a processor, causes the processor to implement a described method.

These, and other, aspects are described in the present document.

DETAILED DESCRIPTION

Section headings are used in the present document only to improve readability and do not limit scope of the disclosed embodiments and techniques in each section to only that section. Certain features are described using the example of 5G wireless protocol. However, applicability of the disclosed techniques is not limited to only 5G wireless systems.

Under some weather conditions, lower densities at higher altitudes in the Earth's atmosphere cause reduced refractive index, bending signals back towards the Earth. Under such circumstances, signals can propagate in a higher refractive index layer (also referred to as the atmospheric duct) because the reflection and refraction are encountered at the boundary with a lower refractive index material. In this mode of propagation, radio signals experience less attenuation and are being guided over distances far greater than the normal radiate range. The frequency range which is usually influenced by this phenomenon is around 0.3 GHz-30 GHz.

A Time Division Duplex (TDD) system adopts the TDD duplex mode, and transmits and receives signals in the same frequency band. The uplink and downlink signals are differentiated by being transmitted in different time periods in the time domain. For example, in the Time Division Long Term Evolution (TD-LTE) frame structure, there are downlink subframes, uplink subframes, and special subframes, wherein all symbols in the downlink subframe are downlink symbols and all symbols in the uplink subframe are uplink symbols. The special subframe includes the downlink part of the special subframe, the guard period (GP), and the uplink part of the special subframe. The GP does not transmit any signal and provides protection between the uplink and the downlink symbols, thereby avoiding cross-link interference between the uplink and the downlink transmissions.

Figure 1:
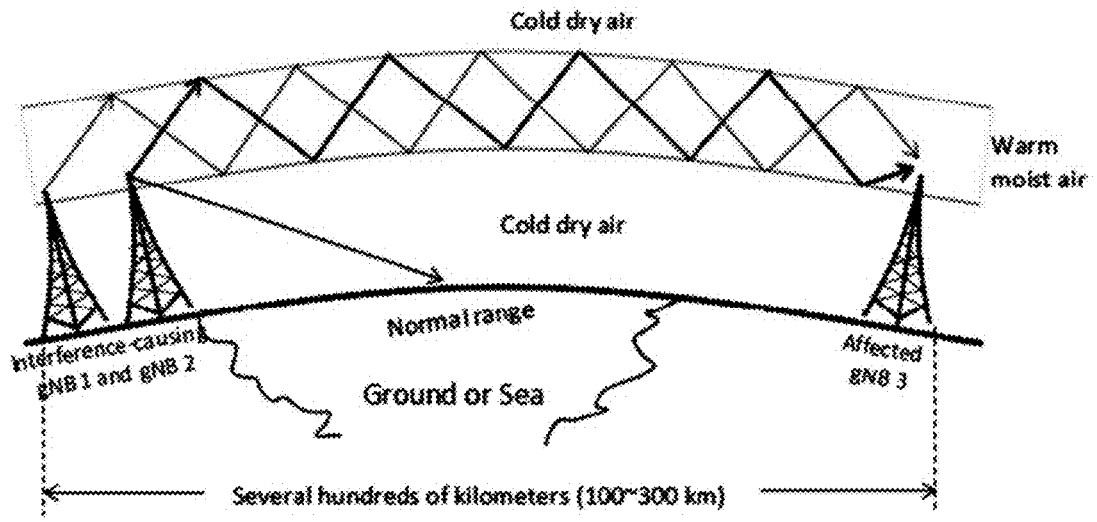
FIG. 1 shows an example of a remote interference caused by an atmospheric ducting phenomenon.
Figure 2:
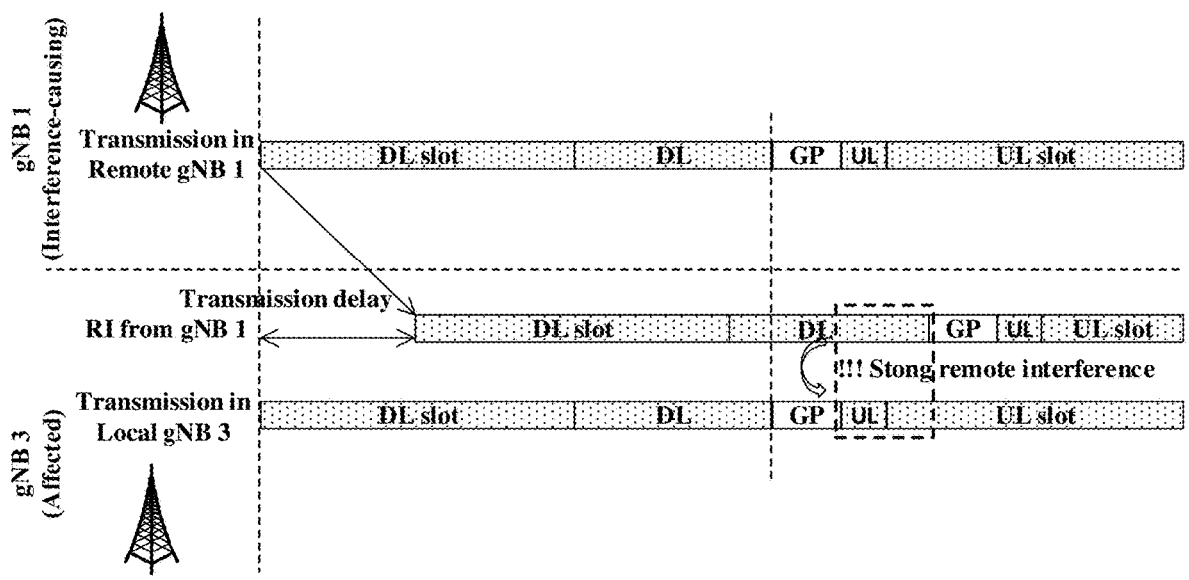
FIG. 2 shows an example of interfered uplink frames caused by the atmospheric ducting phenomenon depicted in FIG. 1.

However, when the atmospheric ducting phenomenon happens, radio signals can travel a relatively long distance, and the propagation delay goes beyond the gap. In this case, the downlink signals of a first base station can travel a long distance and interfere with the uplink signals of a second base station that is far away, causing interference known as remote interference. FIG. 1 shows an example of a remote interference caused by an atmospheric ducting phenomenon. In FIG. 1, the downlink signals from gNB 1 (101) can travel across the ground or sea and interfere with the uplink signals of gNB 3 (103). FIG. 2 shows an example of interfered uplink frames caused by the atmospheric ducting phenomenon depicted in FIG. 1. As shown in FIG. 2, downlink transmissions from gNB 1 (101) can arrive at gNB 3 (103) after a long transmission delay (201). As indicated by the overlapping area 202, some of the downlink symbols transmitted by gNB1 (101) now interfere with the uplink symbols transmitted by the gNB3 (102).

In order to solve the remote interference problem, it is first useful to determine the interference source, and the determination of the interference source involves the transmission of a signal such as a reference signal. After determining the source of interference, it is also useful to accurately perform the interference cancellation mechanism. The present document discloses techniques that can be used by embodiments to provide a signal transmission method for interference cancellation and an interference cancellation method, which can solve the problem of far-end interference and cross-channel interference caused by atmospheric waveguides.

In some embodiments, a remote interference management (RIM) may include the following.

Architecture-1:

The interfered base station (e.g., the interfered gNB) confirms that it is subject to RI interference, and the interfered base station transmits the reference signal RS-1.

The interfering gNB detects RS-1. When RS-1 is detected, it is judged that the receiving network device, e.g., gNB, is interfering with others. The interfering base station performs a RIM interference avoidance scheme and transmits the reference signal RS-2.

The interfered base station detects RS-2:
  If RS-2 is detected, it is judged that the atmospheric waveguide phenomenon still exists and the interfered base station continues to transmit RS-1;
  If RS-2 is not detected, it is judged that the atmospheric waveguide phenomenon disappears and the transmission of RS-1 is stopped;
The interfering base station continues to detect RS-1:
  If RS-1 is detected, continue to execute the RIM interference avoidance scheme and continue to send RS-2;
  If RS-1 is not detected, it is judged that the atmospheric waveguide phenomenon disappears, then the execution of the RIM scheme is stopped, and the transmission of RS-2 is stopped;
Here, RS-1 and RS-2 may be the same or different reference signals.

Architecture-2.1:

The interfered base station confirms that it is subject to RI interference, and the interfered base station transmits the reference signal RS (or is identified as RS-1).

The interfering base station detects the RS (RS-1). When the RS is detected, it is judged that the interfering base station interferes with others. The interfering base station performs the RIM interference avoidance scheme and notifies the interfered base station that it has received the RS through the backhaul.

If the subsequent interfering base station does not receive the RS, the interfering base station notifies the interfered base station that it has not received the RS through the backhaul, and stops executing the RIM scheme.

Interfered Base Station:
  If the backhaul signal received by the RS is received, it is judged that the atmospheric waveguide phenomenon still exists and the RS is continuously transmitted;
  If receiving backhaul signaling that the RS has not received, it is judged that the atmospheric waveguide phenomenon disappears and the transmission of the RS is stopped;

Architecture-2.2:

The interfered base station confirms that it is subjected to RI interference, and the interfered base station transmits the reference signal RS;

The interfering base station detects the RS. When the RS is detected, it is judged that it interferes with others. The interfering base station notifies, through the backhaul, the interfered base station that it has received the RS.

If the interfered base station receives the backhaul signaling received by the RS transmitted by the interfering base station, the interfered base station sends the auxiliary RIM coordination information to the interfering base station.

After the interfering base station receives the RIM coordination information, the RIM scheme is executed.

If the subsequent interfering base station does not receive the RS, the interfering base station notifies the interfered base station that it has not received the RS through the backhaul, and stops executing the RIM scheme.

If the interfered base station receives the backhaul signaling that the RS does not receive, it determines that the atmospheric waveguide phenomenon disappears and stops transmitting the RS.

The above architectures provides a general description. Not every step in each architecture is necessary, and other steps can be added.

In some embodiments disclosed herein, a first base station transmits signals or information, and the second base station receives signals or information, thereby performing a far-end interference cancellation scheme, which can solve the atmospheric waveguide remote interference problem.

It may be assumed that, generally, only semi-static Time Division Duplexing (TDD) configurations are adopted between gNBs, and only co-channel interference exists between adjacent gNBs. It is also assumed that if there is no atmospheric waveguide interference or far-end interference, the semi-static downlink (DL) and uplink (UL) configured by the gNBs in the whole network do not conflict with each other. To ensure this, a consensus is that the entire network needs to be in a DL-UL switching cycle or transmission cycle. To achieve this, wireless systems may configure a maximum downstream transmit boundary (maximum DL transmission boundary and a maximum UL send boundary (maximum UL transmission boundary).

Figure 3:
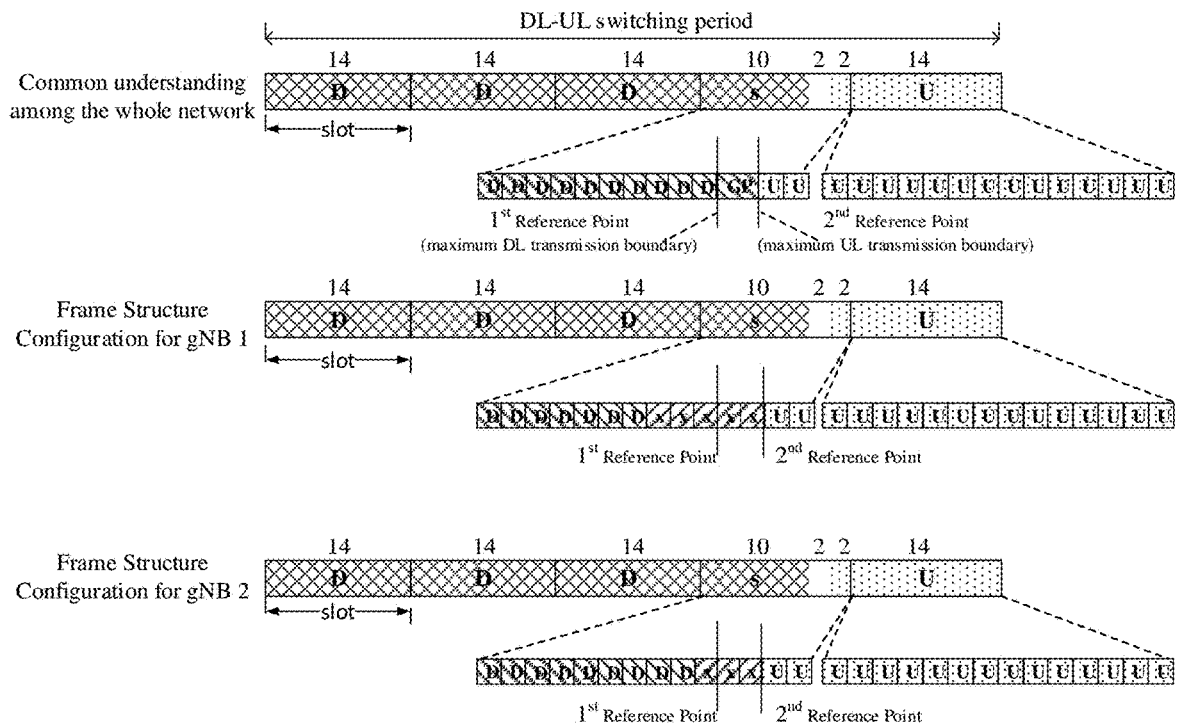
FIG. 3 shows an example of different frame structures used by different base stations with respect to the common understanding of the maximum downlink transmission boundary and the maximum uplink transmission boundary.

As shown in FIG. 3, in one DL-UL switching period or transmission period, the maximum DL transmission boundary is represented by a first reference point, and the maximum DL transmission boundary or the first reference point indicates the last DL OFDM symbol allowed to be scheduled. The maximum UL transmission boundary is represented by a second reference point, and the maximum UL transmission boundary or the second reference point indicates the first UL symbol allowed to be scheduled.

FIG. 3 shows three timelines followed by transmissions. The horizontal axis represents time. In the top timeline, an arrangement of network transmissions in two directions (inbound/outbound or downlink/uplink) that is followed by nodes in a wireless network. Slots marked D represent one direction in which network transmissions occur (e.g., downlink), slots marked "U" indicate another direction in which the network transmissions occur (e.g., uplink) and the slot marked "S" indicates spacing for switching between the two directions. As can be seen in the drawing, due to network delay, the downlink transmissions may occupy channel time that exceeds the last D slot and occur up to a time maximum transmission boundary that falls in the S slot. Similarly, the earliest U transmission may also extend to a maximum uplink transmission boundary due to network delays and clock skews. A guard period (GP) may separate the first reference point and the second reference point.

The middle timeline in FIG. 3 shows the example of a 3-slot backoff performed by the gNB1, which results in three additional "X" (flexible symbols) in the slot S.

The bottom timeline shows frame structure configuration for gNB2 (interfered node) corresponding to the backoff situation of the middle timeline, showing that interference has been mitigated due to the introduction of backoff that is 3 symbols in granularity.

The methods of the various embodiments described below can be used alone or in combination. The terminology of the interfering base station and the interfered base station is used here only for ease of description, and in some cases the interfering base station receiving the signal may have no interference to the interfered base station. The interfered base station may be interfered by other base stations, but the interfering base station here receives the signal it sends Embodiment 1

Interfering Base Station Side

Method 1.1: The interfering base station receives the first reference signal, called RIM-RS, transmitted by the interfering base station, performs an interference cancellation mechanism, and reduces interference to the interfered base station.

The reference signal RIM-RS is transmitted by the interfered base station for confirming the interference source. The interfered base station may measure and analyzed received signals to determine that it has suffered an atmospheric waveguide or far-end interference, thereby triggering the transmission of the RIM-RS.

After receiving the reference signal sent by the interfered base station, the interfering base station determines whether it (generally the downlink of the interfering base station) generates atmospheric waveguide interference or far-end interference to the interfered base station (generally, the uplink receiving of the interfered base station). If there is interference, then the interfering base station performs an interference cancellation mechanism.

The interference cancellation mechanism may include, for example, a downlink fallback (DL backoff), an airspace scheme, increasing downtilt, reducing site height, etc.

The downlink fallback may include one or more of the following: time domain fallback, power backoff, frequency domain fallback and may also include an airspace scheme, such as no longer transmitting DL in some beam directions.

The downlink backoff means that the downlink data cannot be sent, configured, or scheduled on some resources, or the downlink transmission power is reduced.

For the time domain downlink fallback, especially referring to the resource before the first reference point (or the maximum downlink transmission boundary), the first reference point is made to be preceded by a DL symbol or a flexible symbol.

The present document uses the time domain downlink fallback as an example, but other fallbacks are possible. For example, the method presented in this paper also applies to power backoff or frequency domain fallback.

The downlink fallback may be performed forward from the last symbol or the last DL symbol before the first reference point. In other words, the symbol for performing the downlink backoff includes the last one or more symbols before the first reference point (the last symbol is consecutive with the first reference point time domain), or the last one or more DL symbols (the last DL symbol and the first reference point time domain may be continuous or discontinuous, depending on the configuration of the slot structure.

Here, for "last or multiple symbols", means that these symbols are DL symbols, GP symbols, or Flexible symbols (usually represented by X or F symbols), cannot be configured as DL or scheduled as DL after rollback. symbol. Without this limitation, the generally flexible symbol can be reconfigured to a DL symbol later. The flexible symbol that performs the downlink fallback cannot be configured as a DL symbol. It can only be a flexible symbol or a GP symbol unless the downlink fallback is canceled. For "last one or more DL symbols", it means that the object of the downlink backoff is the DL symbol before the first reference point. A downlink fallback is performed on these DL symbols.

There are several methods for downlink fallback: In one example implementation, the interfering base station does not schedule DL data transmission on these symbols. Alternatively, or in addition, the interfering base station silences on these symbols; or the interfering base station reconfigures the slot format and configures these DL symbols as flexible symbols. Further, these flexible symbols can no longer be reconfigured as DL symbols. The interfering base station reconfiguration slot format may be configured by a higher layer parameter tdd-UL-DL-ConfigurationCommon (and tdd-UL-DL-ConfigurationCommon2), tdd-UL-DL-ConfigDedicated, or by a group-common physical downlink control channel PDCCH.

The granularity of the downlink fallback may be as follows:

Sub-method 1.1.1: The interfering base station receives the RIM-RS and/or timing information transmitted by the interfered base station to determine the number of interfered UL resources. The DL fallback is performed according to the number of interfered UL resources.

For example, assume that the interfered base station transmits a signal (RIM-RS) on the last symbol before the first reference point (assuming a=1), and assumes that the interfering base station can receive the RIM-RS on the UL symbol.

In the first step, the interfering base station calculates the transmission delay of the interfered base station to the interfering base station.

Transmission delay n_delay=the number of symbols between the first reference point and the second reference point n1+the number of symbols between the first UL symbol and the second reference point in the base station n2+the sequence number of the UL symbol in which RIM-RS is received by the base station s. The last term on the right side of the equation is the sequence number (or index) for the UL symbols. For example, the first UL symbol number after the second reference point is 1 and the second UL symbol number is 2. The latter two items may be combined to "the number of the symbol in which RIM-RS is received by the base station after the second reference point". For example, the first symbol number after the second reference point is 1. The second reference point is also referred to as a maximum uplink reception boundary or a maximum uplink transmission boundary, and the second reference point may be followed by a flexible symbol or a UL symbol.

In the second step, the interfering base station calculates the number of flexible symbols between the interfering base station DL and the interfered base station UL.

N_x=the number of symbols between the first reference point and the second reference point n1+the number of symbols between the first reference point and the last DL symbol of the base station n0+the number of symbols between the first UL symbol scheduled by the interfered based station and the second reference point m2

The interfered base station. is the RIM-RS transmitting base station.

In the third step, the interfering base station calculates the number of UL resources that are interfered by the cell.

N_interfered=n_delay−n_x=the number of symbols between the first UL symbol and the second reference point in the base station n2+the sequence number of the UL symbol in which RIM-RS is received by the base station s−the number of symbols between the first reference point and the last DL symbol of the base station n0−the number of symbols between the first UL symbol scheduled by the interfered based station and the second reference point m2.

The first two items in the rightmost operation of the above formula may be combined into "the sequence number of the symbol in which RIM-RS is received by the base station after the second reference point" and is numbered from 1.

If m2 is considered, interfered=the sequence number of the symbol in which RIM-RS is received after the second reference point s2 (numbering from the second reference point, starting from 1)−the number of symbols between the first reference point and the last DL symbol of the base station n0−the number of symbols between the first UL symbol scheduled by the interfered based station and the second reference point m2.

If m2 is considered, the above configuration information (the number of symbols between the first UL symbol scheduled by the interfered based station and the second reference point m2) may be sent by the RIM-RS to the base station or the base station set through the RIM-RS scrambling code information, or sequence information, or send timing information to carry. The timing information may be a period of transmission of the RIM-RS, offset, subframe information/slot information, and the like.

Alternatively, the foregoing configuration information is sent by the RIM-RS transmitting base station or the base station set to other base stations through backhaul signaling. The other base stations may be interfering base stations, or other base stations or base station sets to be received RIM-RS, or a designated base station or set of base stations.

If m2 is not considered (assuming=0 or directly not considering m2, X is also treated as an interfered resource, that is, more DL symbols is backoffed), in fact interfered=the sequence number of the symbol in which RIM-RS is received after the second reference point s2 (numbering from the second reference point, starting from 1)−the number of symbols between the first reference point and the last DL symbol of the base station n0.

If the interfered base station does not transmit a signal (RIM-RS) on the last symbol before the first reference point, then the configuration information (the number of symbols between the last DL symbol and the first reference point m0) needs to be notified to the interfering base station or interfering base station set. The notification method is the same as the above m2 notification method.

Sub-method 1.1.2: The interfering base station receives the reference signal (RIM-RS) sent by the interfered base station, and performs an interference cancellation mechanism, such as a DL fallback, according to the configured granularity or preset granularity.

Atmospheric waveguide interference experienced by an interfered base station (UL reception) is likely to be a superposition of interference from multiple interfering base stations. Sometimes it is difficult for the interfered base station to calculate the exact amount of interfered resources based on the received reference signal. For example, in sub-method 1, the interfered base station configuration information m2 and/or m0 needs to be notified to the interfering base station, but there is a certain difficulty whether it is through air interface or backhaul signaling. In addition, for the power domain fallback or a power domain method, it is difficult for the interfering base station to determine how much power needs to be reduced at the beginning. Therefore, the interfering base station receives the RIM-RS sent by the interfered base station, and performs DL fallback according to a configured granularity or a preset granularity.

The configured granularity or preset granularity for DL symbols backoff may be 1 symbol or multiple symbol, or power reduction of 1 dB or more dB, or frequency domain fallback of one RB or multiple RBs, or frequency domain fallback of one subband or multiple subbands, or frequency domain fallback of one BWP (partial bandwidth) or multiple BWPs. The granularity setting or configuration can be set or configured by OAM, S1/NG, X2/Xn. The granularity can be a fixed value of a configuration or preset.

Accordingly, in some embodiments, the interfered base station transmits interference status information to the interfering base station. This interference status information, for example, may omit transmitting a specific amount of backoff that is to be performed by the interfering base station.

Preferably, after the interfered base station receives the reference signal RIM-RS2 sent by the interfering base station (the RIM-RS2 is sent by the interfering base station to confirm whether the atmospheric duct phenomenon still exists), or after the interfered base station receives the information of RIM-RS detection through backhaul, the interfered base station transmits the interference status information to the interfering base station. Alternatively, after the interfering base station performs an interference cancellation mechanism, such as a downlink backoff, the interfered base station transmits the interference status information to the interfering base station.

The interference status information includes at least one of the following: ACK (or no interference), NACK (or interference still exists), interference level or interference level, number or duration of interfered resources, granularity of continued adjustment (e.g., number of symbols for backoff, power) Reduced value, frequency domain granularity of backoff), whether RIM-RS2 is received, and whether atmospheric waveguide phenomenon exists;

The interference status information may be transmitted to the interfering base station by the interfered base station through an air interface (e.g., reuse RIM-RS, or a new signal e.g. RIM-RS3), backhaul signaling (X2, Xn, S1, or NG signaling), or by OAM configuration.

RIM-RS3 may be a new signal different from RIM-RS or RIM-RS2, for example different from the RIM-RS or RIM-RS2 sequence or the generation parameters of the sequence; or the same as RIM-RS or RIM-RS2 sequence, but configured parameters are different, RIM-RS3 has a set of separate configuration parameters (cycle, offset, duration, time-frequency position, timing relationship, one or more).

After receiving the interference status information, the interfering base station selects at least one of the following operations: maintaining the existing interference cancellation mechanism unchanged, further performing interference cancellation, and stopping the execution of the interference cancellation mechanism.

For example, the interference cancellation mechanism performed by the interfering base station is to back off 3 DL symbols (e.g., as depicted in FIG. 3) or reduce the 3 dB DL transmission power. If the interfering base station receives the interference status information (ACK), the existing scheme of "backoff 3 DL symbols or reduce the DL transmission power by 3 dB" is maintained. If the interfering base station receives the interference status information (NACK), based on "backing off 3 DL symbols or reducing 3 dB DL transmit power", the base station may continue to roll back 1 DL symbol or reduce 1 dB DL transmit power. If the interfering base station receives interference status information (but no RIM-RS2 or atmosphere is received), it may conclude that the waveguide phenomenon does not exist, and the interfering base station stops performing the interference cancellation mechanism.

The first time of the interference cancellation mechanism performed after receiving the RIM-RS transmitted by the victim and the second time of the interference cancellation mechanism performed after receiving the interference status information can be different. For example, the method in the first time is DL symbols backoff in time domain. But the method in the first time is frequency domain based solution or implementation based solution.

In order to reduce the signaling overhead exchanged between the interfered base station and the interfering base station, the times of the transmission of interference status information can be limited to one or two or several times. Correspondingly, the times of interference cancellation performed in the interfering side can be limited to one or two or several times.

Interfered Base Station Side

1. Corresponding to the first method one in Embodiment 1 (method 1.1), before the interfering base station performs an interference cancellation mechanism such as a downlink backoff, the interfered base station performs the following operations.

The configuration information (the RIM-RS transmitting base station first UL symbol is less than the second reference point symbol number m2) may be a scrambled information, or sequence, by the interfered base station (RIM-RS transmitting base station) or the interfered base station set through the RIM-RS Information, or sent timing information to carry. The timing information may be a period of transmission of the RIM-RS, offset, subframe information/slot information, and the like.

Alternatively, the foregoing configuration information is sent by the interfered base station or the set of the interfered base station to the interfering base station or the interfering base station set by backhaul signaling or OAM. Backhaul signaling may include X2, Xn, S1 or NG signaling.

If the interfered base station does not transmit a signal on the last symbol before the first reference point, then the configuration information (the last DL symbol of the RIM-RS transmitting base station from the first reference point symbol number m0) needs to be notified to the interfering base station or interfering. set of base stations. The notification method is the same as the above m2 notification method.

2. Corresponding to the second method of the first embodiment, after the interference base station performs the interference cancellation mechanism, for example, the downlink backoff, the interfered base station performs the following operations.

The interfered base station transmits interference cancellation status information to the interference base station.

Preferably, after the interfered base station receives the reference signal RIM-RS2 sent by the interfering base station (the RIM-RS2 is sent by the interfering base station to confirm whether the atmospheric waveguide phenomenon still exists), or after a backhaul message, the interfered base station transmits the interference status information to the interfering base station. Alternatively, after the interfering base station performs an interference cancellation mechanism, such as a downlink backoff, the interfered base station transmits the interference status information to the interfering base station.

The interference status information includes at least one of the following: ACK (no interference), NACK (interference still exists), amount of interference level, number or duration of interfered resources, granularity of continued adjustment (e.g., number of symbols for backoff, power backoff value, frequency domain granularity of rollback), whether RIM-RS2 is received.

The interference cancellation status information may be configured by the interfered base station through an air interface (e.g., RIM-RS, or RIM-RS3), backhaul signaling (X2, Xn, S1, or NG signaling), or by OAM.

RIM-RS3 may be a new signal different from RIM-RS or RIM-RS2, for example different from the RIM-RS or RIM-RS2 sequence or the generation parameters of the sequence; or the same as RIM-RS or RIM-RS2 Sequence, but configured parameters are different, RIM-RS3 has a set of separate configuration parameters (cycle, offset, duration, time-frequency position, timing relationship parameters one or more).

Embodiment 2: In this Example, the Base Station Sends the RIM-RS and/or the RIM-RS2

For larger subcarrier spacing cases, a transmission delay of 300 km between base stations corresponds to more OFDM symbols (e.g., 14 OFDM symbols requiring 14 15 kHz subcarrier spacing for 300 km. If 30 kHz, 28 OFDM symbols are required). In this way, after the RIM-RS transmitted by the interfering base station is delayed (crossing the Flexible symbol and a 14-symbol UL slot), it may fall on the DL slot of the interfering base station. Because the interfering base station is likely to detect the RIM-RS only on the UL symbol or the Flexible symbol.

In order to enable the RIM-RS transmitted by the interfered base station to be detected on the uplink symbol of the interfering base station, the interfered base station configures the transmission resource of the RIM-RS at several specific locations, or transmits the RIM at least at several specific locations. A specific location includes at least one of the following:

The last symbol before the first reference point or called the downlink transmission boundary, continuous with the first reference point time domain. That is, the first symbol before the first reference point. A RIM-RS may be transmitted on one or multiple symbols. If the RIM-RS is transmitted on multiple symbols, at least the last symbol is included. The last symbol is transmitted to ensure that the short-range base station can receive the RIM-RS on the UL symbol and the Flexible symbol.

The last Nth symbol before the first reference point (N is not equal to 1) may be as follows. N may depend on subcarrier spacing, transmission distance/transmission delay, number of flexible symbols after the first reference point, first reference point to the next complete UL slot One or other factors, such as the number of UL symbols, the number of symbols of the UL slot, etc. For example, for a transmission distance of 300 km and a subcarrier spacing of 30 kHz, the number of flexible symbols after the first reference point is 3, the first reference point to the next number of UL symbols for a complete UL slot is 2, and the number of symbols for the UL slot is 14. Then N=14*2−3−2−14+1=10.)

The RIM-RS transmission method is also applicable to RIM-RS2. The RIM-RS2 is transmitted by the interfering base station for the interfered base station to confirm whether the atmospheric waveguide phenomenon still exists.

Embodiment 3: The Base Station Sends the RIM-RS or the RIM-RS2

This embodiment describes several implementations of how the ID information is carried by RIM-RS or RIM-RS2, In the LTE scheme, the 10 ms radio frame includes two 5 ms periods (sub-frames or transmit-time intervals), and the RIM-RSs are transmitted in the upper and lower two fields respectively, and 3-bit gNB ID information (through eight sequences) can be carried in each field. In the upcoming technology based on New Radio (NR), NR's dl-UL-TransmissionPeriodicity is flexible: it can include values from {0.5, 0.625, 1, 1.25, 2, 2.5, 5, 10} milliseconds, and can support two dl-UL-TransmissionPeriodicity patterns P and P2. The sum of the cycles (P+P2) is divisible into individual portions. P and P2 are two periods that are connected end to end in transmission along the timeline. For example, P=3 ms, P2=2 ms, then a time period of 20 ms can be divided into {P, P2, P, P2, P, P2, P, P2}.

In some implementations, the RIM-RS unit time (for example, 5 ms, 10 ms or 20 ms) is divisible by P+P2, that is, contains an integer number of P+P2 periods, or n1 RIM-RS occasions. In some implementations, the RIM-RS unit time (for example, 5 ms) may be divisible by P—that is, it contains an integer number of P periods, or n2 RIM-RS occasions. The RIM-RS unit time can also be a period different from P and P2, generally greater than P and P2, for example, the transmission period of the RIM-RS.

As previously described, the reference signal transmissions are performed at different transmission occasions (symbols) along time. Some example embodiments of how the RIM-RS is sent in units of time include:

Method 3.1: All occasions send the same RIM-RS, which carries the same ID information (gNB ID or gNB set ID).

Method 3.2: All occasions send different RIM-RSs, which carry different ID information.

Method 3.3: The occasions in the period P send the same RIM-RS, and these RSs carry the same ID information. The occasions in period P2 send the same RIM-RS, which carry the same ID information. However, the occasions in the period P and in the P2 send different RIM-RSs, which carry different ID information.

If there is only one occupancy in the period P in the unit time and there is only one occupancy in the period P2, then the two occasions send different RIM-RSs, and these RSs carry different ID information. The above methods may be illustrated by an example. For example, RS in different occasion may carry a part of ID information (gNB ID or gNB set ID). For example, the total number of one gNB ID is 20 bits. RS in different occasion may only carry 4 bit portions of the ID. If there are four occasions in a period, method 3.1 may be implemented such that transmissions in each occasion carry the same 4 bit (the remaining bits may be delivered in another period). Using method 3.2, each occasion may carry a single bit, but this bit may communicate the entire ID, one bit at a time. Using method 3.3, ID may be split into M-bit portions and repeated M times. For example, two occasions may carry same 2 bits, another two occasion may carry the other 2 bit, and so on.

For method 3.2 or method 3.3, how does the receiving base station splice together the ID information belonging to the same transmitting base station or transmitting base station set may be performed in many different ways. For example, power difference of the RIM-RS sent by the same base station in different occasion should be less than a certain threshold. If the power difference of the RIM-RS is greater than this threshold, the receiving base station may abandon the splicing. If the receiving base station still obtains multiple results of splicing even when splicing is performed according to the threshold, the splicing may be refrained from using.

Figure 13:
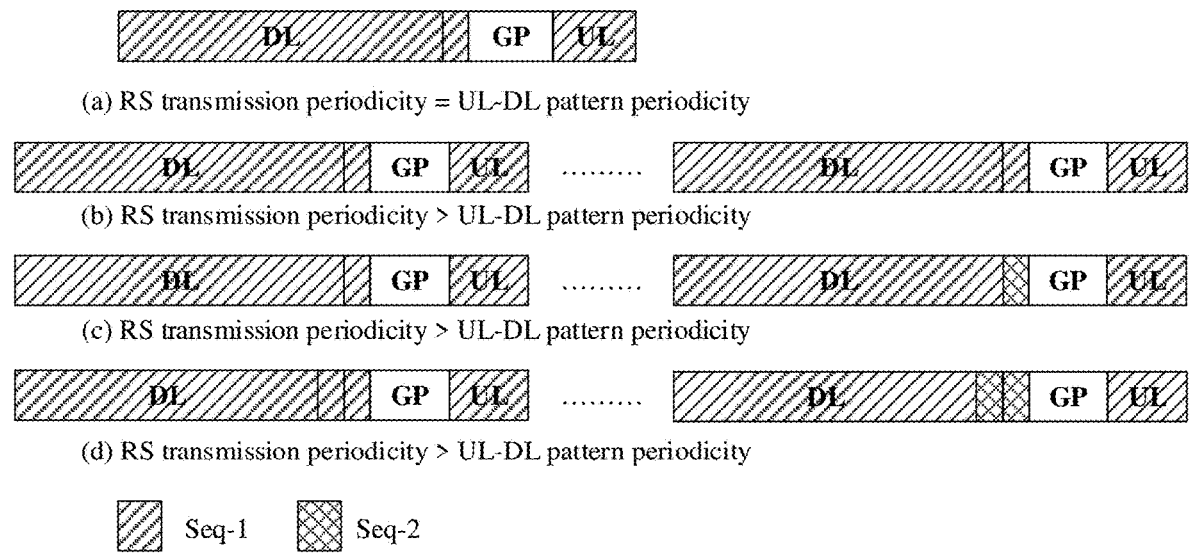
FIG. 13 depicts examples along time domain of a remote interference management (RIM) reference signal (RS).

The UL-DL transition periodicity which corresponds to a RIM-RS transmission occasion in NR is configurable. If the RIM-RS transmission periodicity matches the UL-DL pattern transition, there is only one occasion to for RIM-RS transmission, as it is shown in FIG. 13(a). If multiple, e.g., M>1, UL-DL transition periodicities are configured in the RS transmission periodicity as it is shown in FIG. 13(b)~FIG. 13(d).

There are different methods to convey ID information.

Method 1: As shown in FIG. 13(b), the same generation sequence is used for different occasions, the detection performance could be enhanced by the repetition, while less ID information is conveyed.

Method 2: As shown in FIG. 13(c), to convey more information, different generation sequences are used for each occasion. The flaw is that it the detection is more than once.

Method 3: Different with FIG. 13(c), the RS in FIG. 13(d) is repeated in each occasion. So the way to transmit RIM-RS depends on the ID length, RS transmission periodicity and UL-DL transition periodicity.

Embodiment 4: A Unified Design of RIM-RS and RIM-RS2

As described in other embodiments, after the interfered base station confirms that it is interfered with the atmospheric waveguide, it transmits a RIM-RS for confirming the interference source. After receiving the RIM-RS, the interfering base station sends the RIM-RS2 to the interfered base station, and the interfered base station confirms whether the atmospheric waveguide phenomenon still exists.

The transmission method of the RIM-RS in the second embodiment is also applicable to the RIM-RS2.

In order to reduce the design complexity and detection complexity of the two signals, the following methods are designed (the following methods can be combined):

Method 4.1: Configure dual-cycle, send RIM-RS in one cycle, and send RIM-RS2 in another cycle. With such a duty cycle based implementation, both reference signals may be based on a save waveform, but their occurrence in pre-defined time occasions may define whether this is RIM-RS or RIM-RS2 transmission. For example, the RIM-RS is transmitted in the period configured by the tdd-UL-DL-ConfigurationCommon, and the RIM-RS2 is transmitted in the period configured by the tdd-UL-DL-Configuration-Common2; the above two parameters are high-level parameters in the 3GPP TS38.331-f30 Used to configure the slot format.

Further, RIM-RS and RIM-RS2 can be configured with one and the same transmission period, in which RIM-RS and RIM-RS2 are transmitted in two different small periods (for example: tdd-UL)-DL-ConfigurationCommon and tdd-UL-DL-ConfigurationCommon2). These two small cycles can be connected end to end. The RIM-RS or RIM-RS2 can be sent only once or multiple times in a small cycle in a large cycle, or in each small cycle.

Method 4.2: Configure the same period of reference signal transmission, but configure different offsets for each reference signal. RIM-RS and RIM-RS2 are distinguished by different offsets to avoid collisions and interference.

Method 4.3: RIM-RS and RIM-RS2 are configured with different transmission periods, and there is a multiple relationship or a certain functional relationship between their periods, for example, n1*T1=n2*T2, where T1/T2 are respectively RIM-RS/RIM—The period of RS2, n1 and n2 are positive integers. In other words, RIM-RS and RIM-RS2 are configured with different transmission densities (or their resource densities are different). For example, the resource configuration or transmission density of the RIM-RS is high, and the resource configuration or transmission density of the RIM-RS2 is low, and the resource configuration or transmission pattern of the RIM-RS2 is a subset of the RIM-RS.

The detection period or detection pattern of the RIM-RS and RIM-RS2 is the same as the first method, the second method or the third method.

Embodiment 5

In this embodiment, a time-domain circular characteristics should be satisfied for NR RIM RS (RIM-RS or RIM-RS2 or RIM-RS3) design. In current 3GPP study, there are three alternatives are used for NR RIM RS design. The first alternative is 1 symbol RS. The second and third alternatives are multiple symbols RS (e.g. 2 symbol) RIM-RS and both of them has multiple consecutive sequences (e.g. 2 sequence). The details are as follows.

Alt 1: 1 symbol RS using existing CSI-RS with comb-like structure in frequency-domain;

Comb factor=2 and 4;

Alt 2: multiple (e.g. 2) symbol RS, where multiple (e.g. two) copies of the RS sequence are concatenated and one CP (cyclic prefix) is attached at the beginning the concatenated sequences;

Alt 3: multiple (e.g. 2) symbol RS, where one CP is added to the front of the first OFDM symbol, and one postfix is added to the end of the last OFDM symbol.

In the following, we give a method for Alt 2 and Alt 3 can use the same FFT as PDSCH generation.

Figure 14:
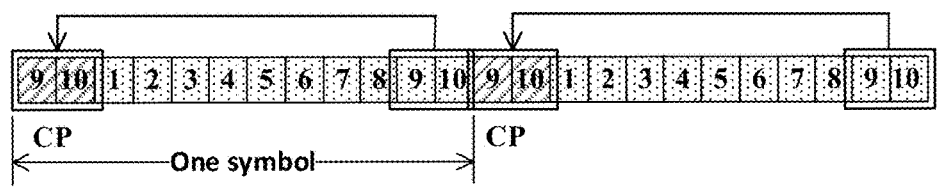
FIG. 14 shows an example of original symbol generation, e.g., physical downlink shared channel PDSCH generation.
Figure 15:
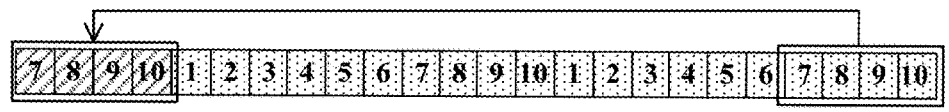
FIG. 15 shows an example of orthogonal frequency division multiplexing (OFDM) signal generated for Alt-2 and Alt-3 methods.
Figure 15:
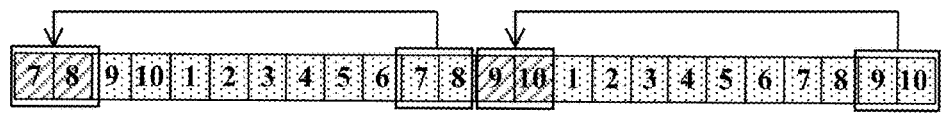
Figure 15:
Figure 15:
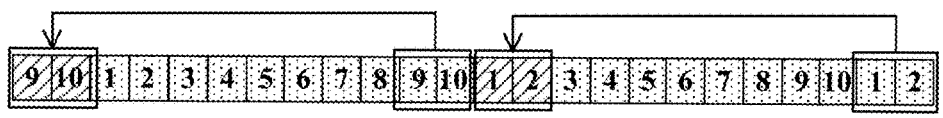

The legacy PDSCH generation in one symbol is shown in FIG. 14.

Wherein the CP of Alt-2 is attached at the beginning of concatenated sequences which is shown in FIG. 15(a), and the CP of Alt-3 is added separately at the beginning and end of the concatenated sequences which is shown in FIG. 15(c). Obviously, method-1 for Alt-2 in FIG. 15(a) and method-3 for Alt-3 in FIG. 15(c) cannot use the same FFT as PDSCH generation.

To reuse the FFT as PDSCH generation and keep the time-domain circular characteristics, the OFDM baseband generation methods for Alt-2 in FIG. 2(b) and Alt-3 in FIG. 15(d) are provided.

The first part of original CP in the first symbol is still used as CP, and other part of original CP is used as data/sequence. And/or, The data/sequence in the beginning of the second symbol and/or the latter symbols is used as CP.

For example, in FIG. 15(a), The last four symbols in the end of the second symbol is attached at the beginning the concatenated sequences as original CP in the method-1 for Alt-2. Obviously, such symbol generation cannot reuse the FFT as PDSCH generation as shown in FIG. 14. In FIG. 15(b), part (the first two symbols) of original CP in FIG. 15(a) is still used as CP, but other part i.e. the last two symbols of original CP in FIG. 15(a) is used as data/sequence. Further, the first two symbols that is originally data/sequence in the second symbol are used as CP.

At the same time, the different OFDM symbols (e.g. The second symbol) should be multiplied with different linear phase factor in frequency domain or should be circularly shifted in time domain for both method-2 and method-4.

In addition, For Alt 2: 2 symbol RS, where two copies of the RS sequence are concatenated and one CP is attached at the beginning the concatenated sequences;

Method 1: in frequency domain, the RIM-RS in different OFDM symbols need to be multiplied with different linear phase rotation factors.

Method: in frequency domain, the RIM-RS in different OFDM symbols do not need to be multiplied with different linear phase rotation factors.

Figure 4:
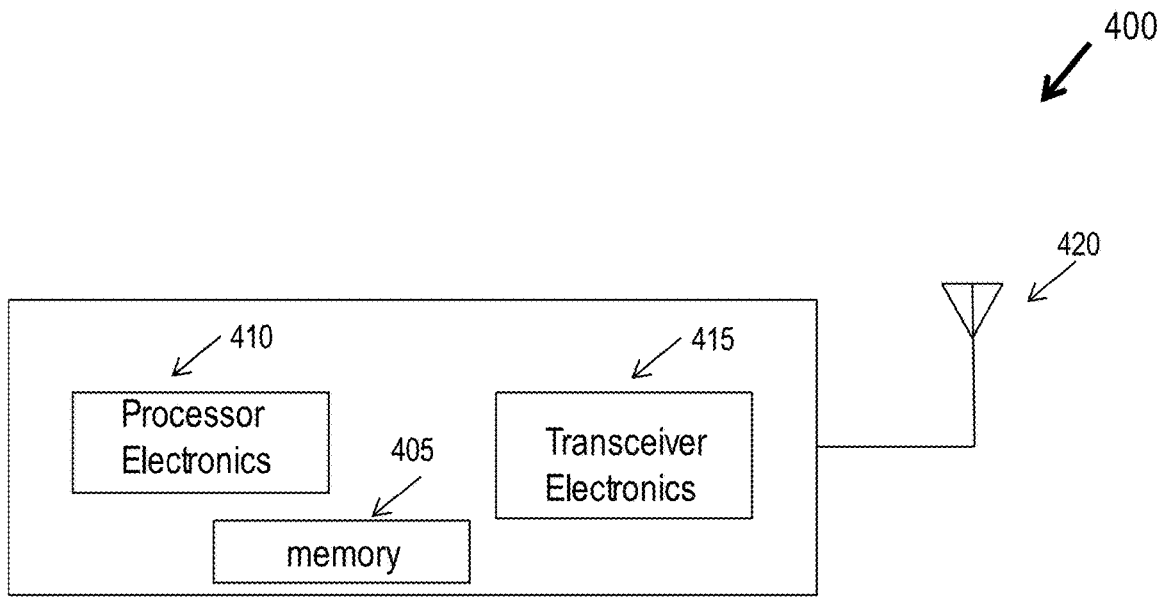
FIG. 4 is a block diagram representation of a portion of a radio station in accordance with one or more embodiments of the present technology can be applied.

FIG. 4 is a block diagram representation of a portion of a radio station. A radio station 405 such as a base station or a wireless device (or UE) can include processor electronics 410 such as a microprocessor that implements one or more of the wireless techniques presented in this document. The radio station 405 can include transceiver electronics 415 to send and/or receive wireless signals over one or more communication interfaces such as antenna 420. The radio station 405 can include other communication interfaces for transmitting and receiving data. Radio station 405 can include one or more memories (not explicitly shown) configured to store information such as data and/or instructions. In some implementations, the processor electronics 410 can include at least a portion of the transceiver electronics 415. In some embodiments, at least some of the disclosed techniques, modules or functions are implemented using the radio station 405.

Figure 5:
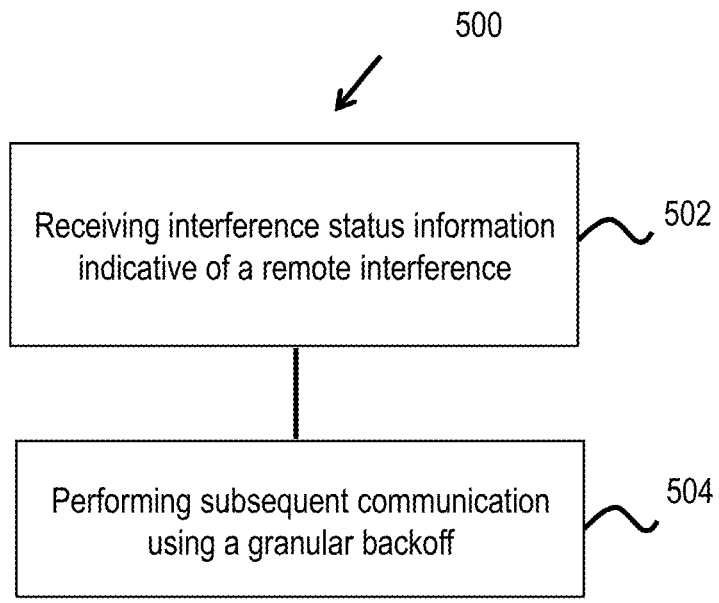
FIG. 5 is a flowchart for an example method of wireless communication.

FIG. 5 is a flowchart for an example method 500 of wireless communication. The method 500 includes receiving (502), at a first communication node, interference status information indicative of a remote interference between the first communication node and a second communication node, and performing (504), by the first communication node, subsequent communications to the second communication node by implementing a backoff based on a granularity. For example, the method 500 may be implemented by the interfering base station in a wireless system.

Another method of wireless communication includes transmitting, by a first communication node, a first reference signal indicative of presence of remote interference between the first communication node and a second communication node, wherein time domain positions of the first reference signal includes one of a last symbol before a maximum downlink transmission boundary for transmissions between the first communication node and the second communication node, or an Nth symbol prior to the transmission boundary, where N is an integer greater than 1.

Another method of wireless communication includes transmitting, by a first communication node, a first reference signal indicative of presence of remote interference between the first communication node and a second communication node, wherein the first reference signal is transmitted in preconfigured time periods and wherein the first reference signal is transmitted at multiple occasions in each time period and communicating an ID information associated with the first communication node using the first reference signal.

Another method of wireless communication includes transmitting, from a first communication node, a first reference signal related to a first interference on an inbound channel to the first communication node and a second reference signal related to a second interference on an outbound channel from the first communication node. The first reference signal and the second reference signal are transmitted in a non-overlapping manner.

In some embodiments, the first communication node and the second communication nodes may be base stations (gNBs) and may be implemented using the hardware platform described with respect to FIG. 4.

Example embodiments of applicability of the disclosed technology to the upcoming 5G standard may be explained using the following description.

1. Terminology

The following description of the framework uses the term "victim" for an interfered communication node and the term "aggressor" for an interfering communication node.

2. Discussion on the Frameworks

RIM framework is an essential part to study start/termination mechanisms for RS transmission and RIM operation in Scenarios #1 and #2. Several RIM frameworks have been identified in the RAN1 #94 meeting as the starting point for the study of RIM [3]. Due to time limitation and standardization complexity, we believe further study of their pros and cons while only focus on some simple framework(s) is reasonable for future specification work in Rel-16. In the following sections, we give our views on each RIM framework.

2.1 Framework-0

Figure 6:
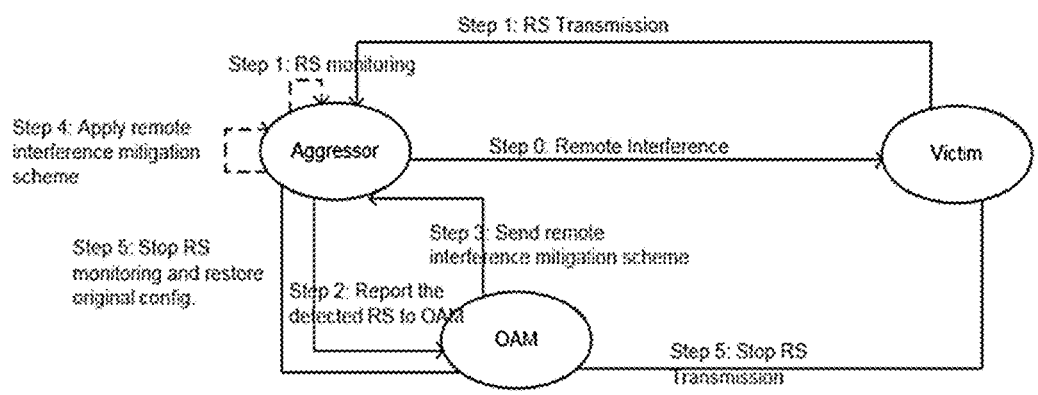
FIG. 6 shows an example workflow for framework-0.
Figure 7:
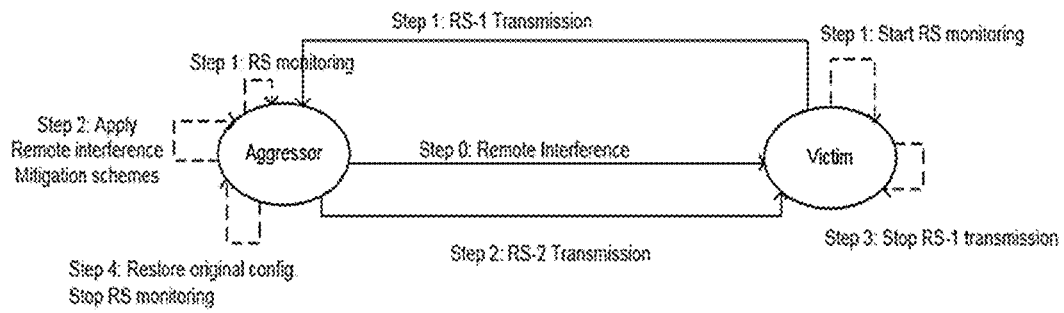
FIG. 7 shows an example workflow for framework-1.

FIG. 6 shows example workflow of Framework-0

The common points of Framework-0/1/2.1/2.2 are that the victim gNB at first should confirm it is interfered with RI (remote interference) in Step 0 as shown in FIG. 1, and then transmit a reference signal to the aggressors in Step 1. Specifically, if IoT level in the victim side exceeds the threshold and demonstrates some remote interference characteristics e.g. "sloping" like IoT increase, the victim can infer that it is interfered with RI and will trigger the events, i.e. start RS transmission. The measurement pattern of IoT to identify RI can be considered or left to implementation.

Most of the next RIM steps after Step 1 in Framework-0 are the operation of the gNBs and OAM, including the aggressor reports the detected RS to OAM, OAM sends RI mitigation scheme to the aggressor, the aggressor applies the scheme and OAM stops RS transmission/detection and restores original configuration. These processes can be realized by implementation, thus the standardization complexity of Framework-0 is the lowest.

2.2 Framework-1

Figure 8:
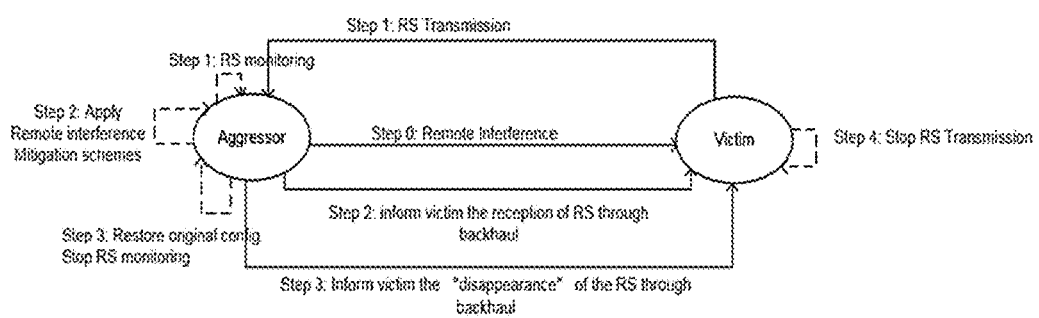
FIG. 8 shows an example workflow for framework-2.1.

FIG. 8 shows an example workflow of Framework-1

In Scenario #1 with symmetric IoT increase, the aggressor is also a victim. Same as the victim side, it can trigger the same events through IoT measurement and analysis, i.e. RS-1 transmission and RS-2 monitoring. Besides, the victim and the aggressor also need to trigger RS-1 monitoring to detect RS-1 transmission from each other. The events triggered by the victim (also as an aggressor) and the aggressor (also as a victim) should be aligned if they adopt the same triggering strategy. The events regardless of who trigger should include in Step 1: RS-1 transmission, RS-2 monitoring and RS-1 monitoring.

In Scenario #2 with asymmetric IoT increase, the IoT level where the aggressor suffers may be lower than the threshold while the total IoT level at the victim side exceeds the threshold. In this case, RS-1 monitoring in Step 1 cannot be triggered by IoT and can only be triggered through OAM configuration. Periodic monitoring or event triggered can be considered. Some of the field test results and conclusions can be used as the input to assist the OAM configuration.

Observation 1: The following are observed for Scenario #1 and Scenario #2:

At least for Scenario #1 with symmetric IoT increase, the events triggered at the victim and the aggressor could be aligned if they adopt the same triggering strategy e.g. through IoT level and characteristics.

In Scenario #2, RS monitoring in Step 1 cannot be triggered dynamically by IoT measurement and can be triggered through OAM configuration.

RS-1 is used to assist the aggressors to recognize that they are causing remote interference to the victim and to deduce how many UL resources of the victim are impacted by the aggressors. If the aggressors knows the ID information of the victim gNB or the gNB set that the victim is located in, it can perform RIM mitigation scheme more pertinent, e.g. adjust antenna down-tilting. Furthermore, considering the forward-compatibility of the framework, RS-1 in framework-1 should also carry the gNB ID or the set ID information. The RS-1 transmission pattern should be configurable to satisfy different requirements, e.g. overhead, latency and less collisions. The RS-1 detection pattern should also be carefully designed to meet detection performance, reduce detection complexity and avoid impacts on existing UL signal reception.

Observation 2: Considering the forward-compatibility and various possible RI mitigation schemes, RS-1 in framework-1 carrying the gNB ID or the set ID information is necessary.

In the whole procedure for remote interference management, RS-1 is the key/essential part. Considering that it is difficult to reuse the existing reference signal to meet the detection requirements, it is necessary to introduce a dedicated reference signal for RIM. More details on RIM-RS design can be referred to our companion contribution [4].

If RS-1 is detected, the aggressor will recognize that it is causing RI to the victim and deduce how many UL resources of the victim are impacted. Then the aggressor should perform the corresponding remote interference mitigation schemes (Step 2), e.g. DL back-off, which will be further discussed in section 3. Moreover, the aggressor will send RS-2 (Step 2), which is used to assist the victim to decide if the atmospheric duct phenomenon still exists.

If the victim receives RS-2 sent in Step 2, it determines that the atmospheric duct phenomenon still exists. In this case, the victim should continue to send RS-1. Correspondingly, if the aggressor receives RS-1 sent by the victim, it continues to perform RI mitigation scheme, transmit RS-2 and monitor RS-1. If the atmospheric duct phenomenon persists, the victim and the aggressor always perform the loop between them.

The victim may fail to detect RS-2, perhaps because the aggressor does not send RS-2 due to it cannot detect RS-1, or because RS-2 has arrived at the victim side with little energy due to the atmospheric duct phenomenon has weakened or disappeared even though the aggressor has sent RS-2. If RS-2 cannot be detected in a certain period and IoT going back to certain level, the victim will determine the atmospheric duct phenomenon has disappeared, then it can stop RS-1 transmission and RS-2 monitoring (Step 3).

If RS-1 cannot be detected for a certain period with the similar reason as Step 3, the aggressor will determine that the atmospheric duct phenomenon has disappeared, then it can stop RS-2 transmission and RS-1 monitoring, and restore original configuration before RIM operation (Step 4).

The above termination mechanism depends mainly on the transmission and detection of the RS-1 and RS-2. Another simple and feasible solution is that: once the aggressor receives the RS-1 and then performs the RI mitigation scheme, it can start a timer. If the timer does not expire, the aggressor will always execute the mitigation scheme. Otherwise, the aggressor can terminate the RI mitigation scheme and restore original configuration. At the victim side, if the IoT increase demonstrates the characteristic "sloping" in time domain, the victim will continue to transmit the RS-1. Otherwise, the victim can stop RS-1 transmission.

From the analysis on RS-1 in Step 1 and RS-2 in Step 2, we can see the functionalities of RS-1 and RS-2 can be different, thus they may have different designs. In order to reduce the complexity of NR-RIM standardization, the necessity of RS-2 transmission should be further assessed. For example, a timer instead of RS-2 transmission can be used to achieve the termination of the RI mitigation scheme and RS-1 transmission.

Based on the above, seems RS-2 transmission is not essential in framework-1. RAN1 should study if a single RS can solve both functionalities, or at least should strive for a common RS design for two RSs as much as possible. Otherwise, alternatives such as timer based scheme should be considered for Framework-1.

Proposal 1: RAN1 should assess the necessity of RS-2 transmission in Framework-1 from the perspective of the complexity of RS design and standardization:

If yes, RAN1 should strive for a common design for RS-1 and RS-2.

Proposal 2: Timer-based scheme should be considered as an alternative to RS-2 for gNB to terminate RS transmission/monitoring and RI mitigation scheme operation.

2.3 Framework-2.1

FIG. 8 shows an example workflow of Framework-2.1

The main difference from Framework-1 is that, the aggressor in Framework-2.1 informs the victim the status of atmospheric ducting phenomenon through backhaul signaling, instead of by RS-2 transmission/monitoring (or timer-based as we suggest in section 2.1). Framework-1 has lower standardization complexity and is much easier to be realized in commercial networks. In view of these reasons, we slightly prefer Framework-1 if it can work well.

The RS in Framework-2.1 needs to convey victim gNB ID or the set ID information for victim identification and inter-gNB communications through backhaul. If the aggressor needs to identify the unique ID of a victim gNB through RS detection in the coverage with a radius of 300 km, the sequence and timing of the RS sent by the victim gNB need to carry at least 20 bits gNB ID information. Or, if the RS directly carry CGI, cellIdentity or gNB ID in cellIdentity, it needs to convey ID information with more bits to the aggressor. Carrying the complete gNB ID via the RIM-RS poses challenges to the sequence design, transmission timing and detection performance of the RIM-RS. One possible approach is that operators can assign set ID to one or more gNBs that are frequently interfered with or interfered with by other gNBs based on some historical data. Since the number of sets is far less than the number of gNBs, the RS transmitted by the victim gNB can contain set ID only. However, set division, set numbering and set information exchange should be further studied. More details on RIM-RS design can be referred to contributions [4].

Proposal 3: The RIM-RS irrespective of framework chosen should convey victim gNB ID or the set ID information for victim identification and/or inter-gNB communications.

2.4 Framework-2.2

Figure 9:
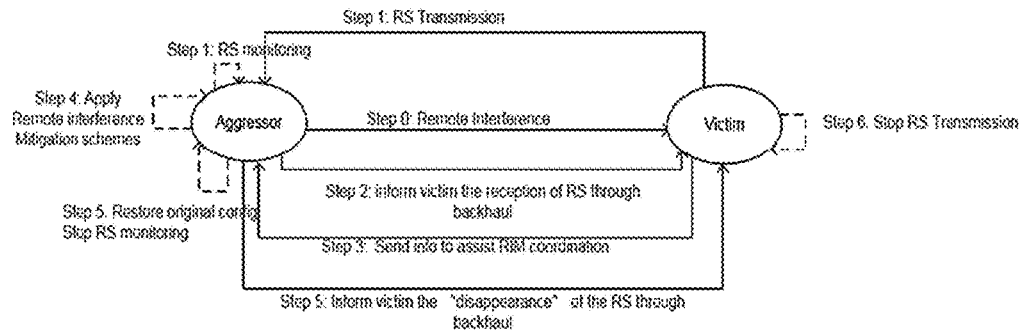
FIG. 9 shows an example workflow for framework-2.2.

FIG. 9 shows an example workflow of Framework-2.2.

Both Framework-2.1 and Frame work-2.2 require the aggressor informs the victim about the reception or disappearance of the RS through backhaul. The difference between Framework-2.1 and Frame work-2.2 is that the former is a one-way backhaul signaling transfer from the aggressor to the victim, but the latter is a bi-directional backhaul signaling communication.

"Step 3: send info to assist RIM coordination" may depend on the final design of RIM-RS and what kind of RI mitigation schemes the network takes. For example, if the aggressor can deduce how many UL resources of the victim are impacted based on the RS detection, there is no need for the victim to send the information related to DL backoff or interfered symbols to assist RIM operation. Since the final design of RIM-RS is not yet finished, and the RI mitigation schemes the gNBs adopt are also unclear, it is difficult to determine which coordination information the victim must send to the aggressor at this stage. Therefore, we share the same concerns from RAN3 about unclear benefits and unclear content of RIM coordination assistance information in step 3 of Framework 2.2 [7].

Observation 3: Compared to framework-2.1 and framework-2.2, framework-0 and framework-1 have lower standardization complexity and are easier to be realized.

Proposal 4: Among several possible frameworks identified in RAN1 #94, we have the following proposals:

The design of RS and/or backhaul signaling should be designed to support one or more preferred frameworks (e.g. Framework-0/1/2.1), which framework applied in commercial network can be left to operators/vendors.

3. Potential Mechanisms for Improving Network Robustness 3.1 Time-Domain Based Solutions
3.1.1 Solutions by Network Implementation The victim gNB can reduce the number of uplink symbols as shown in FIG. 10 (left), or the aggressor gNB can reduce the number of downlink symbols as shown in FIG. 10 (middle), or the gNBs at both sides make UL&DL backoff as shown in FIG. 10 (right).

Figure 10:
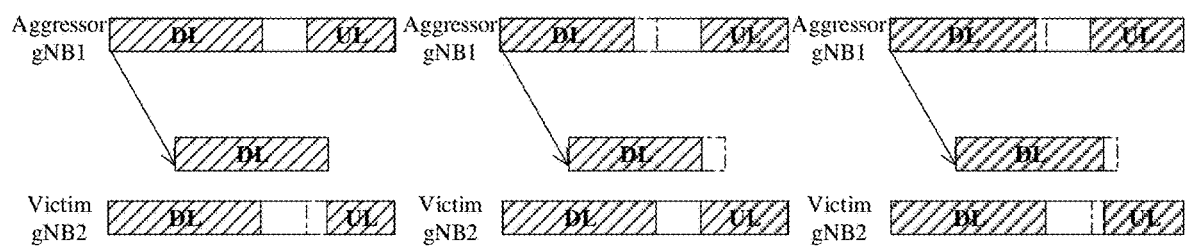
FIG. 10 shows an example of a time domain method for remote interference (RI) mitigation.

FIG. 10 shows an example of a time domain method for RI mitigation (left) Only at the victim side, (middle) Only at the aggressor side, (right) Mitigation at both sides.

The first approach for reducing the number of interfered UL symbols or interfering DL symbols is to re-configure slot format. NR slot format is more flexible and can be reconfigured through high layer parameter tdd-UL-DL-ConfigurationCommon (and tdd-UL-DL-ConfigurationCommon2), tdd-UL-DL-ConfigDedicated, or via group-common PDCCH, etc. The victim gNB can reduce the number of UL symbols by higher layer parameter nrofDownlinkSymbols or nrofDownlinkSlots. The flexible symbols before the interfered UL symbols cannot be reconfigured to UL symbols unless RIM mitigation is terminated. Similarly, the aggressor gNB can reduce the number of DL symbols by higher layer parameter nrofUplinkSymbols or nrofUplinkSlots. The flexible symbols after interfering DL symbols cannot be reconfigured to DL symbols.

Alternatively, the victim gNB can avoid scheduling on UL symbols that are interfered for UL transmission. The victim gNB can also schedule large transmission blocks as CBGs, in which the first one or more CBGs may be not correctly decoded due to remote interference while the following CBGs can be correct. Small transmission blocks can be considered to transmit in the symbols with low interference. The aggressor gNB can perform DL symbols backoff i.e. muting interfering DL symbols, or avoid scheduling on interfering DL symbols for DL transmission. The above scheduling-based method is transparent to UE.

Both the methods of slot format reconfiguration and scheduling-based for RI mitigation can be achieved through existing NR specifications or network implementation, but determining the number of downlink symbols on which the aggressor performs DL symbols backoff or non-scheduling may have specification impact.

Note that uplink/downlink throughput of the victim/aggressor gNB will be affected if RIM mitigation solutions are executed in victim/aggressor gNB side. Relatively speaking, the impact on the uplink may be more serious. Take subcarrier spacing SCS of 15 kHz as an example, the UL part in a 5 ms DL-UL switching periodicity is usually only a bit longer than one slot of 1 ms in the typical TDD macro deployment scenario. The remote interference from the remote aggressor gNB furthest as 300 km away can interfere with most UL symbols (14—the number of flexible symbols after 1st reference point). Time domain method at the victim-only side has great impact on UL performance and DL HARQ_ACK time delay. Therefore, if the time domain method is adopted, RIM should not rely entirely on the victim itself, but rather on the aggressor or both sides.

3.1.2 Solutions with 5G Specification Impact

There are several ways to determine the number of downlink resources on which the aggressor needs to perform DL symbols backoff or non-scheduling, some of which have no specification impact, but some others have.

In the first way, the number of downlink resources is set according to the maximum distance of 300 km (1 ms time delay) between the victim gNB and the aggressor gNB, regardless of the actual distance. That means the aggressor gNBs will configure large enough GP to reduce remote interference to the victim. As long as the aggressor gNBs detect RIM-RS, all of them execute time-domain based solutions on the same number of downlink resources if they have the same slot format. This way has no further impact on the standard (except RIM RS), but it greatly sacrifices the downlink throughput.

In order to perform time domain method more accurately and adaptively at the aggressor side, the second way is that: the aggressor gNB detects/deduces how many UL resources of the victim are impacted by the aggressor. RAN1 in the RAN1 #94bis meeting had agreed that:

The gNB is not expected to receive RS before the DL transmission boundary, and not expected to transmit RS after the UL reception boundary.

Transmission position of RIM RS-1 in framework 1 and RS in framework 2 is fixed in the last X symbols before the DL transmission boundary, i.e., the ending boundary of the transmitted RIM-RS aligns with the 1st reference point Assuming that there are two gNBs (e.g. gNB1 and gNB2 in FIG. 11), and both gNBs comply with above rules. However, due to the number of flexible symbols before the 1st reference point and after the 2nd reference point may be different for two long-distance gNBs, the following problems may arise when the gNB detects the RIM-RS and then deduces how many UL interfered resources. These problems need to be considered when applying time domain method at the aggressor side and designing the RIM-RS.

gNB1 does not interfere with gNB2, but gNB2 is interfered by others gNBs. gNB1 receives the RIM-RS from gNB2 on its UL symbols.

gNB1 interferes with gNB2 on N number of UL symbols, but gNB1 receives the RIM-RS from gNB2 on the N+M (M>0) UL symbols.

gNB2 interferes with gNB1 on N number of UL symbols, but gNB2 cannot receive any RIM-RS on its UL symbols.

gNB2 interferes with gNB1 on N number of UL symbols, but gNB2 receives the RIM-RS from gNB1 on the N-M (0<M<N) UL symbols.

To avoid the above problems and more accurately calculate the number of UL interfered resources, the aggressor gNB needs to know the slot format configuration of the victim gNB, e.g. the number of flexible symbols between the 2nd reference point and the first UL symbol.

Considering that NR may adopt higher subcarrier spacing than 15 kHz (e.g. 30 kHz), the maximum distance of 300 km between two gNBs corresponds to more symbols with the same transmission delay. RIM-RS transmitted by the victim gNB may appear in the DL slot in the next DL-UL switching period at the aggressor gNB side, and it cannot be detected by the aggressor gNB in flexible or UL symbols after the 1st reference point in this DL-UL switching period. Therefore, RAN1 should further study on transmission position of RIM-RS, e.g. how to configure these last X symbols before the 1st reference point.

FIG. 3, discussed previously, depicts examples of DL and UL transmission boundaries within a DL-UL transmission periodicity The third way is that the aggressor gNB performs DL backoff with a small fixed or configurable granularity, e.g. one or more symbols. In this method, the aggressor gNB does not need to calculate the number of interfered UL resources according to the detected RIM RS, which is similar to the first way. While the victim gNB receives the RS-2 in Framework-1 or backhaul signaling in step-2 of Framework-2.1/2.2, the victim gNB sends the RI mitigation state information (RIM-SI) to the aggressor gNB through air interface or backhaul signaling. RIM-SI can include: ACK (no RI), NACK (RI still exists), the number of interfered UL symbols and so on. If the aggressor gNB receives RIM-SI, it decides whether to maintain the existing mitigation scheme unchanged, or continue to perform DL backoff in more symbols, or even stop mitigation scheme. RIM-SI can also be used in the second way for assisting the aggressor gNB to perform RIM mitigation better.

Proposal 5: There are several ways to determine the number of downlink resources on which the aggressor needs to perform time-domain based solutions, e.g. DL symbols backoff or non-scheduling:

Opt 1. Be set according to the distance of 300 km (1 ms time delay), regardless of the actual distance between the victim and the aggressor.

Opt 2. The aggressor deduces how many UL resources of the victim are impacted by the aggressor, but some of the slot format configuration information of the victim need to be informed to the aggressor.

Opt 3. Step by Step to reduce remote interference. Each step is performed only with a small fixed or configurable granularity, e.g. one or two symbols. After the aggressor performed RIM mitigation, the victim sends the RI mitigation state information (RIM-SI) to the aggressor, e.g. ACK, NACK, etc.

Proposal 6: In order to avoid RIM-RS transmitted by the victim falling in the DL symbols in the next DL-UL switching period at the aggressor gNB side, RAN1 should further study on transmission position of RIM-RS.

3.2 Frequency-Domain Based Solutions 3.2.1 Solutions by Network Implementation

The frequency-domain based solutions can be divided into static/semi-static scheme, and adaptive scheme.

Figure 11:
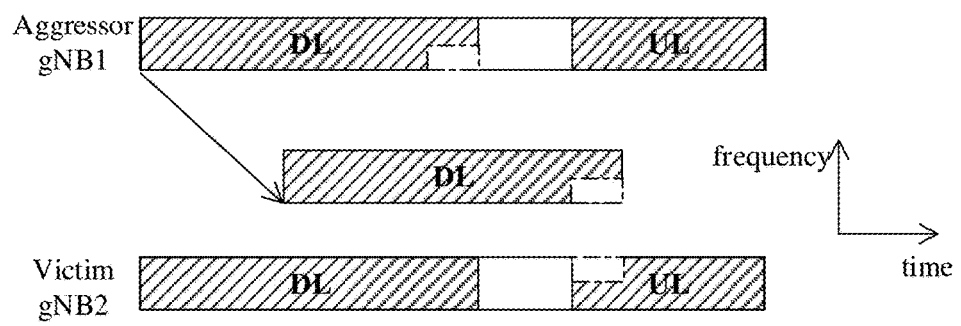
FIG. 11 shows an example of a frequency domain method for remote interference (RI) mitigation.

If static/semi-static FDM (frequency division multiplexing) scheme is applied, there is no need for cooperation and self-adaptation for bandwidth usage with each other between the aggressor and the victim. For example, the UL part in the interfered UL symbols at the victim side always uses a non-overlapped frequency band from the DL part in the interfering UL symbols at the aggressor side, as illustrated in FIG. 11. Once the band pair including two non-overlapped frequency bands for the victim(s) and the aggressor(s) is determined in the early days of network deployment, it will not be adjusted according to the actual interference dynamically. According to the analysis in the time domain method, most of the UL symbols of the victim may be interfered with the remote interference in a typical TDD macro deployment scenario. If the victim UL and the aggressor DL use non-overlapped bandwidths all the time (as in a static manner), the spectral efficiency and UL/DL capacity will be greatly reduced.

For adaptive scheme operated at the victim-only side, the victim can avoid UL transmission on the interfered frequency resource by scheduling or activating different BWPs or sub-bands according to its IoT measurement and analysis. But if the uplink reception in the full bandwidth is interfered, frequency-domain based solutions only applied at the victim side cannot work.

FIG. 11 is an example of the frequency domain method for RI mitigation.

3.2.2 Solutions with 5G Specification Impact

For adaptive scheme, the victim and the aggressor can also work together for utilizing different frequency band between the aggressor DL and the victim UL adaptively, e.g., by scheduling or activating different BWPs or sub-bands with no overlapped bandwidth between them.

The first method is the victim can transmit RIM-RS only in the interfered BWPs/sub-bands to the aggressor. The aggressor judges the interfered UL BWPs/sub-bands based on RIM-RS detection and then avoids scheduling DL transmission on or deactivates the interfered BWPs/sub-bands. This method has impact on RIM-RS design. The other one is the victim informs the aggressor about the information of interfered BWPs/sub-bands via backhaul signaling after a connection between them is established.

3.3 Spatial-Domain Based Solutions 3.3.1 Solutions by Network Implementation

As agreed in RAN1 #94bis, the possible spatial domain RIM mitigation solutions include:

Receiving beam nulling at victim gNB, to suppress the remote interference in spatial domain.

Scheduling UE transmission that will be received in spatial directions that are less interfered at Victim gNB Controlling transmit beam (e.g., down-tilting) at aggressor gNB using different beam directions on different DL positions (e.g. choose the beam direction which experiences minimal interference, then according to reciprocity, use this beam to perform transmission in DL resources adjacent to GP)

Mounting antennas at lower height, electrical/mechanical down-tilt.

At the victim side, it can adopt the solutions of bullet 1/2/5 when it suffers the remote interference. At the aggressor side, it can adopt the solutions of bullet 3/4/5. Both above five methods can be achieved by means of implementation.

3.3.2 Solutions with 5G Specification Impact

All above five methods can be carried out through implementation. But in order to better implement these methods, there can be some standardized optimization.

For instance, if the aggressor knows the ID of the victim gNB or the gNB set, irrespective of framework chosen, it can infer the direction of the victim gNB and the distance between them. Accordingly, it can perform some implementation based solutions more pertinent and accurate, e.g. increase electrical/mechanical down-tilt, lower the site height, or adjust cover orientation/beam of the aggressor site. Moreover, the victim and the aggressor can coordinate beam direction through air interface or backhaul signaling.

3.4 Power-Domain Based Solutions

3.4.1 Solutions by Network Implementation

The UEs at the victim cell increase UL transmission power in the UL interfered symbols as shown in FIG. 8(a), but that will cause more interference to neighbor cells and increase UE power consumption. Or the aggressor gNB reduces DL transmission power, but that will impact on the coverage of the cell as shown in FIG. 8(b).

Both the victim gNB and the aggressor gNB can adjust UL and DL transmission power by implementation. For example, the victim gNB can boost UL transmission power in the interfered UL slot by increasing PO or TPC (transmit power control) command. The aggressor gNB can reduce its DL transmission power by a relatively large margin e.g. 3 dB, and it does not need to care about whether the remote interference is completely eliminated.

Figure 12:
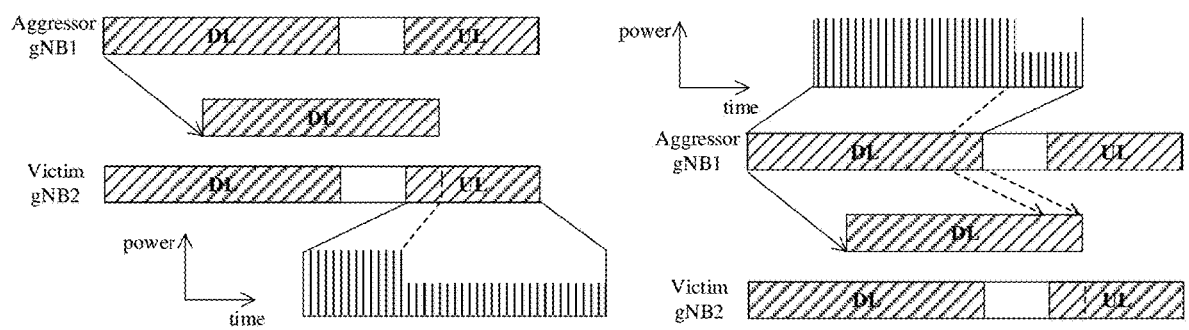
FIG. 12 shows an example of a power domain method for remote interference (RI) mitigation.

FIG. 12 shows examples of the power domain method for RI mitigation, (left) at the victim side, (right) at the aggressor side.

3.4.2 Solutions with 5G Specification Impact

Although some implementation schemes without specification impact were given in section 3.4.1, there are some problems of these implementation schemes. For instance, the victim/aggressor gNB increases/decreases the transmission power by the granularity of one full slot. However, there is actually no RI or RI-generated in some certain symbols in the slot. For the victim cell, it may causes unnecessary power consumption of UE and co-channel interference. For the aggressor cell, it will reduce the downlink throughput and the coverage. Thus, the interfered/interfering symbols and the non-interfered/interfering symbols in a slot can be performed independent power control mechanism. In addition, the aggressor can reduce its DL transmission power step by step, the victim transmits RI mitigation state information (RIM-SI) to assist the aggressor in making the next power decision.

Specifically speaking for the victim scheme, if increasing the UL power of the UE at the edge of the cell, it will cause interference to the uplink of the adjacent cells. It is meaningless to introduce one new interference to solve the remote interference. Moreover, the power margin that the UE at the cell edge can increase is limited, and it is doubtful whether increasing the power of the cell edge UE can resist RI. If increasing the UL power of the UE at the cell center, it means that the remote interference problem is not completely solved, because the bottleneck of RI still lies mainly in the cell edge UE. In addition, whether for cell edge UE or cell center UE, increasing UL power will cause a sharp increase in UE power consumption. Firstly, since the remote interference originates from DL transmission with larger power and has a small fading after passing through the atmospheric duct, it is still dominant compared with the energy from UL reception. Thus it is necessary to evaluate the relationship between UL power increase and system performance with RI. Furthermore, because the atmospheric duct usually lasts for hours or even longer, the UE needs to increase its power continuously in a long duration, which will pose a greater challenge to the power consumption of the UE To sum up, we think RI mitigation methods should be effective, efficient, and have low complexity as much as possible. All the above time/frequency/spatial/power domain methods can be considered to improve network robustness.

Proposal 7: RI mitigation schemes in time domain, frequency domain, spatial domain and power domain can be considered to improve network robustness in Rel-16.

4. Concluding Remarks for the Preceding Description

In this contribution, we discuss some potential schemes for NR-RIM framework and mechanisms for improving network robustness, and have the following observations and proposals:

Observation 1: The following are observed for Scenario #1 and Scenario #2:

At least for Scenario #1 with symmetric IoT increase, the events triggered at the victim and the aggressor could be aligned if they adopt the same triggering strategy e.g. through IoT level and characteristics.

In Scenario #2, RS monitoring in Step 1 cannot be triggered dynamically by IoT measurement and can be triggered through OAM configuration.

Observation 2: Considering the forward-compatibility and various possible RI mitigation schemes, RS-1 in framework-1 carrying the gNB ID or the set ID information is necessary.

Observation 3: Compared to framework-2.1 and framework-2.2, framework-0 and framework-1 have lower standardization complexity and are easier to be realized.

Proposal 1: RAN1 should assess the necessity of RS-2 transmission in Framework-1 from the perspective of the complexity of RS design and standardization:

If yes, RAN1 should strive for a common design for RS-1 and RS-2.

Proposal 2: Timer-based scheme should be considered for gNB to terminate RS transmission/monitoring and RI mitigation scheme operation.

Proposal 3: The RIM-RS irrespective of framework chosen should convey victim gNB ID or the set ID information for victim identification and/or inter-gNB communications.

Proposal 4: Among several possible frameworks identified in RAN1 #94, we have the following proposals:

The design of RS and/or backhaul signaling should be designed to support one or more preferred frameworks (e.g. Framework-0/1/2.1), which framework applied in commercial network can be left to operators/vendors.

Proposal 5: There are several ways to determine the number of downlink resources on which the aggressor needs to perform time-domain based solutions, e.g. DL symbols backoff or non-scheduling:

Opt 1. Be set according to the distance of 300 km (1 ms time delay), regardless of the actual distance between the victim and the aggressor.

Opt 2. The aggressor deduces how many UL resources of the victim are impacted by the aggressor, but some of the slot format configuration information of the victim need to be informed to the aggressor.

Opt 3. Step by Step to reduce remote interference. Each step is performed only with a small fixed or configurable granularity, e.g. one or two symbols. After the aggressor performed RIM mitigation, the victim sends the RI mitigation state information (RIM-SI) to the aggressor, e.g. ACK, NACK, etc.

Proposal 6: In order to avoid RIM-RS transmitted by the victim falling in the DL symbols in the next DL-UL switching period at the aggressor gNB side, RAN1 should further study on transmission position of RIM-RS.

Proposal 7: RI mitigation schemes in time domain, frequency domain, spatial domain and power domain can be considered to improve network robustness in Rel-16.

B1. Preliminary Remarks

The sections below describe examples of RIM-RS that may be used for interference management.

B2. Requirement and Functionality of RIM-RS

In all of the framework candidates, the reference signal is the key and essential part in remote interference management. Considering the scenarios of remote interference management, the reference signals in RIM should fulfill the following requirements:

Performance: In RIM, the reference signal should provide performance with sufficiently good auto-correlation and cross-correlation, low false alarming rate and miss detection probability and so on. Only in this way, correlation based detection can be taken as a reliable method.

Overhead: According to TD-LTE network field test, the atmospheric duct phenomenon would last for several hours. The overhead of reference signal should be taken into consideration to ensure that the throughput of the network would not be seriously deteriorated.

Compatibility: Considering backward compatibility, the reference signal should not cause confusion or detection problem at both gNB and UE sides. At the same time, the impact of existing signals on RIM-RS should also be considered to guarantee the detection performance. In summary, the impact between reference signal for RIM and existing reference signals should be minimized.

Detectable without symbol alignment: Even it is assumed that the whole network is synchronized in the RIM study. The gNB would be interfered by the aggressor gNB in up to several hundred kilometers away. The distance between the victim and the aggressor is unclear. So the RIM-RS should be detectable without symbol alignment.

Furthermore, some functionalities of reference signals have been discussed as following:

Functionality-1: The reference signal in all three frameworks should convey gNB ID or gNB set ID information which would make some RI mitigation mechanisms possible. For example, adjustment of down-tilt and other MIMO related mechanism needs the information of the location of victim gNB ID or gNB set. In addition, ID information is necessary for the aggressor to identify the victim and is necessary and beneficial for inter-gNB communications between the aggressor and the victim through backhaul in Framework-2.1 and Framework-2.2. Therefore, to strive a common RIM-RS design and reduce the complexity of NR-RIM standardization, the reference signal should covey ID information.

Functionality-2: The reference signal should be able to assist the aggressor gNB to identity how far away the impacted gNB is. Without the knowledge of how far away the impacted gNB is and how many uplink symbols are affected, the aggressor may adopt an improper time-domain remote interference mitigation mechanism.

Proposal 1: The design of reference signals in RIM should consider the following factors: performance, overhead, compatibility, detectable without symbol alignment.

Proposal 2: The reference signals in RIM should have the following functionalities: convey gNB ID or gNB set ID and assist the aggressor gNB to identity how many uplink symbols of victim are affected.

B3. Candidates for RIM-RS

According to the discussion in RAN1-#94bis, there are three alternatives that could be used for further evaluation.

B3.1 One-Symbol RS

Alt-1 is one symbol reference signal with comb-like structure in frequency domain, whose comb factor is 2 or 4. As it is shown in FIG. 1. The comb-like structure reference signal repeats consecutively within a symbol. With a detection window that is smaller than an OFDM symbol, the additional part could be taken as a cyclic prefix. So the single port CSI-RS is detectable even without the OFDM symbol alignment. However, that requires detector with a FFT size different from the one used for uplink transmission. In our companion contribution, an OFDM-symbol long detector is used in the simulation. From the simulation results, it can be seen that the detection performance of comb-like structure is inferior to that of other alternatives. Considering the field test results in LTE, the channel is very sensitive to the weather condition. Such comb-like structure with one symbol may not be robust enough to meet the requirements.

Figure 16:
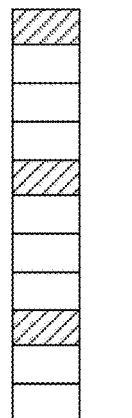
FIG. 16 shows alternatives for symbol reference signal with comb-like structures.
Figure 16:
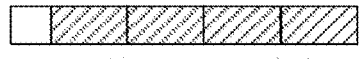
Figure 16:
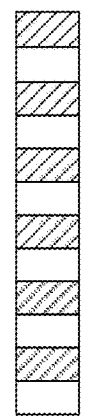
Figure 16:
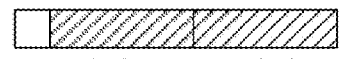

FIG. 16 shows an alternative of a one symbol reference signal with comb-like structure. FIG. 16 (a) shows a comb factor=4 and FIG. 16(b) shows an example of comb factor=2.

Observation 1: Comb-like structure with one symbol RS may be not robust enough to meet the requirements.

B3.2 Two-Symbol RS

The Alt-2 RIM-RS is constructed with two consecutive sequences. Wherein the CP of Alt-2 could be attached at the beginning of concatenated sequences which is shown in FIG. 17(a). To reuse the FFT as PDSCH generation and keep the time-domain circular characteristics, another OFDM baseband generation methods for Alt-2 can be considered which is shown in FIG. 17(b). At the same time, the different OFDM symbols should be multiplied with different linear phase factor in frequency domain or should be circularly shifted in time domain.

Figure 17:
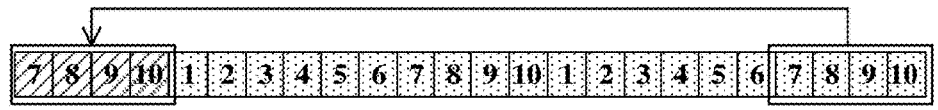
FIG. 17 shows an example of an OFDM baseband signal generation for two-symbol RS.
Figure 17:
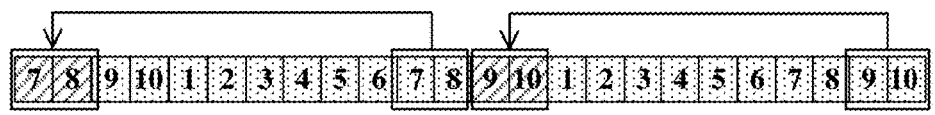

FIG. 17 shows an example of OFDM baseband signal generation for two-symbol RS.

Observation 2: The Alt-2 RIM-RS could reuse the FFT as PDSCH signal generation.

The two-symbol RS shows a better detection performance over the one-symbol comb-like factor. Considering that transmission periodicity of RIM-RS in LTE is about 2.7307 minutes, the additional overhead of two-symbol RS is small.

Observation 3: Considering the RIM-RS transmission periodicity, the additional overhead of two-symbol RS is small.

Proposal 3: Two-symbol RS, where two copies of the RS sequence are concatenated and one CP is attached at the beginning the concatenated sequences could be used as the RIM-RS.

B4. ID Information

To meet the Functionality-1, the RIM-RS should convey gNB or gNB set ID information to assist the aggressor to identify the victim and/or adopt proper mitigation mechanism.

Code Domain

The detection performance may decrease when the number of the sequences used to convey ID increase. Considering that the RI would last for hours from LTE field test results, and the detection complexity would be non-negligible if a large number of sequences is adopted. So, the number of sequences to generate RIM-RS should be limited, for example, to be eight.

Proposal 4: The number of sequences to generate RIM-RS should be limited, for example, to be eight.

Time Domain

Figure 18:
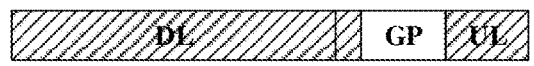
FIG. 18 shows an example of RIM-RS transmission in time domain.
Figure 18:
Figure 18:
Figure 18:

The UL-DL transition periodicity which corresponds to a RIM-RS transmission occasion in NR is configurable. If the RIM-RS transmission periodicity matches the UL-DL pattern transition, there is only one occasion to for RIM-RS transmission, as it is shown in FIG. 18(*a*). FIG. 18 RIM-RS transmission in time domain If multiple, e.g. M, UL-DL transition periodicities are configured in the RS transmission periodicity as it is shown in FIG. 18(*b*)-FIG. 18(*d*), there are different methods to convey ID information. In FIG. 18(*b*), the same generation sequence is used for different occasions, the detection performance could be enhanced by the repetition, while less ID information is conveyed. In FIG. 18(*c*), to convey more information, different generation sequences are used for each occasion. The drawback is that the detection is more than once. Different with FIG. 18(*c*), the RS in FIG. 18(*d*) is repeated in each occasion. So the way to transmit RIM-RS depends on the ID length, RS transmission periodicity and UL-DL transition periodicity.

Proposal 5: To enhance the detection performance and robustness of RIM-RS, there are two methods that could be used a) repeating RIM-RS within a transmission periodicity; b) repeating RIM-RS within an occasion. Furthermore, the repetition factor should be configurable.

Observation 4: RIM-RS transmission pattern depends on the ID length, RS transmission periodicity and UL-DL transition periodicity.

As to the transmission pattern in FIG. 18(*c*) and FIG. 18(*d*), the receiver should combine the ID information in different transmission occasions to obtain the whole ID. It should be noted that if the receiver detects ID-1 and ID-2 at occasion-1, and also detects ID-3 and ID-4 at occasion-2. There would be four different interpretations, i.e., (ID-1, ID-3), (ID-1, ID-4), (ID-2, ID-3), (ID-2, ID-4). To deal with the ambiguity, the combinations used to convey ID should be limited.

Proposal 6: If the ID information is obtained by combining different transmission occasions, the possible combinations used to convey ID should be limited to reduce the ambiguity.

Frequency Domain

In LTE, the maximum frequency bandwidth is 20 MHz and a full bandwidth reference signal is utilized for RIM. While for NR FR1 and FR2 the maximum frequency bandwidth may be up to 100 MHz and 400 MHz respectively. To decrease the blind detection complexity, the position which could be the starting, end, or the center of RIM-RS in frequency domain should be fixed, e.g. at the synchronization raster.

Proposal 7: To reduce the blind detection complexity, the position of RIM-RS in frequency domain should be fixed.

Some potential problems of using FDM method to convey ID information is discussed as follows:

The ambiguity problem would occur again if some FDM methods are used to convey ID information. For example, two sub-bands are used to represent ID information per gNB. If three reference signals are detected at different sub-bands at an occasion, there would be six different interpretations. It is difficult for detector to recognize the ID information from the six candidates.

If the band that is used to convey ID is partially overlapped with the one the RI happens, the detection performance would be degrade as only partial RS is detected.

From the above analysis, if both the RS-1 and RS-2 are necessary in Framework-1. TDM is a better way to distinguish the two reference signals, e.g. offset within the transmission periodicity, the transmission occasion and so on.

Proposal 8: If both RS-1 and RS-2 are necessary in Framework-1, they should be distinguished by TDM.

B5. RIM-RS Pattern

In RAN1 #94 meeting, it was agreed that the whole network with synchronized macro cells has a common understanding on a DL and UL transmission boundary within a DL-UL transmission periodicity. Furthermore, in RAN1 #94bis, the RS-1 in Framework-1 and RS in other frameworks are agreed to occupy the last X symbols before the DL transmission boundary.

As to the RS-2 in framework-1, which is used to inform whether the remote interference still exists, should be detectable by the victim gNB. If the RS-2 is placed on last several symbols after DL symbol backoff, there is a risk that RS-2 arrives at the GP symbols which may not be detected by the victim gNB as the GP symbols would suffer a stronger interference from the neighbor cell. In this situation, the victim gNB would stop transmitting RS-1 and may result into ping-pong effect. The RS-2 is periodically transmitted per gNB, it is distributive from the perspective of the whole macro cell. The interference would not accumulate and cause a strong impact at the victim gNB even the RS-2 is placed at the last symbols before the DL transmission boundary.

Observation 5: If the position of RS-2 is backoff as the DL symbol, it may be undetectable at the victim gNB side.

Observation 6: The interference would not accumulate and cause a strong impact at the victim gNB even the RS-2 is placed as the last symbols before the DL transmission boundary.

Proposal 9: Same as RS-1, RS-2 in Framework-1 should be placed at the last symbols before the DL transmission boundary.

Figure 19:
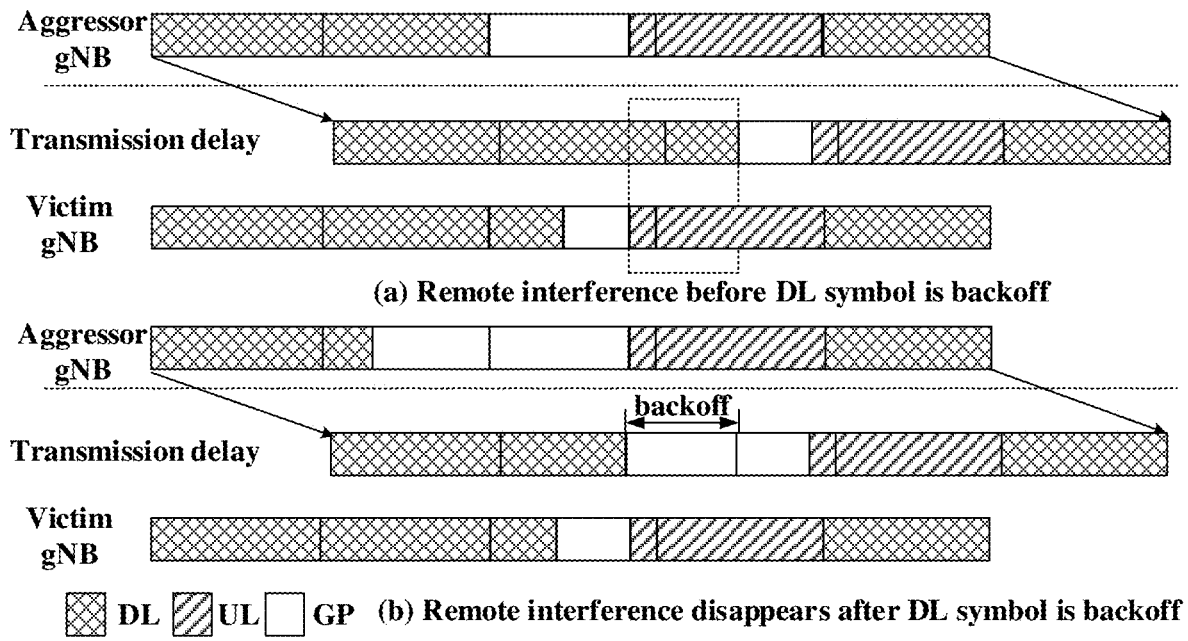
FIG. 19 shows an example of Remote interference management.

According to LTE field test results, the distance between the victim and the aggressor gNBs could be up to 300 km which corresponds to a delay of 1 ms. In LTE, if the transmission delay of aggressor gNB is 1 ms, its DL signals still arrive at UL symbol and causes interference at the victim gNB side, as it is shown in FIG. 19(*a*). FIG. 19 shows an example of a remote interference management.

After the gNB recognize itself as an aggressor and deduce how many UL symbols it interferes, it can reserve the last DL symbols that cause interference as GP then the RI would mitigate or disappear, which is shown in FIG. 19(*b*).

Figure 20:
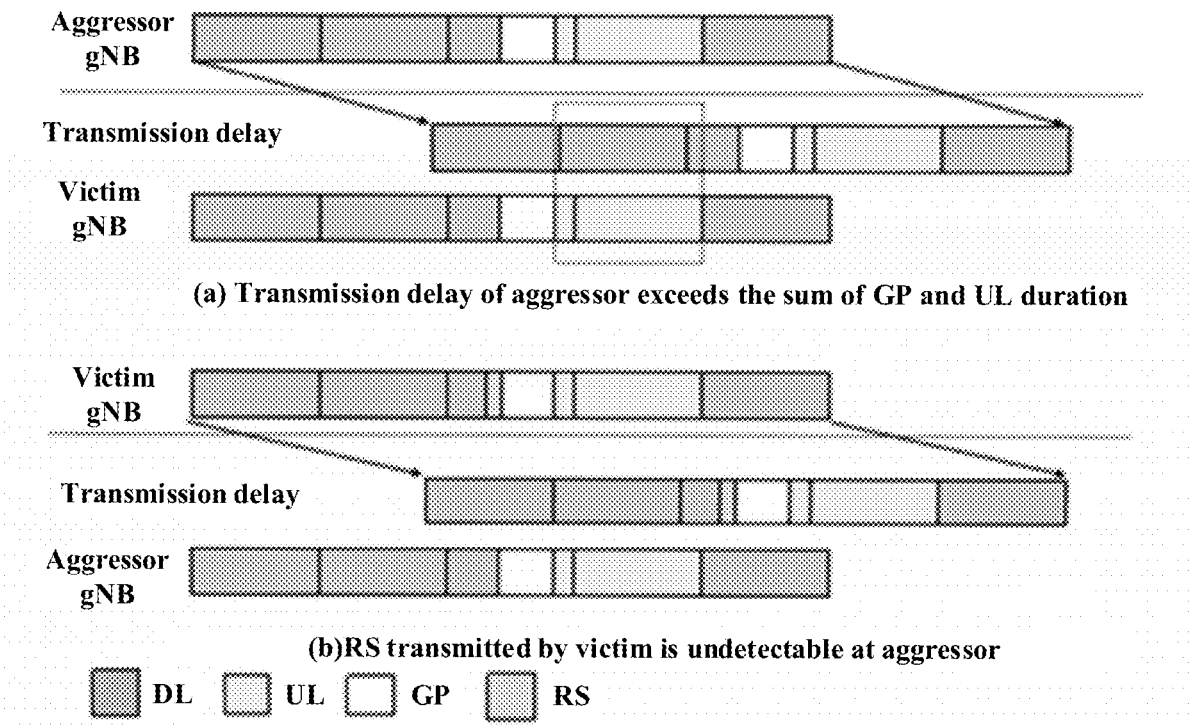
FIG. 20 shows an example of Remote interference management with a smaller UL-DL transition periodicity.

FIG. 20 shows an example of remote interference management with a smaller UL-DL transition periodicity.

However, different numerologies and UL-DL transmission periodicities are supported in NR. The transmission delay may exceed the sum of GP and UL duration which is shown in FIG. 20(*a*). As the gNB is not expected to detect RS at the DL duration, the aggressor would not detect the RS transmitted at the DL boundary and it would not recognize itself aggressor as it is shown in FIG. 20(*b*).

Observation 7: In NR, if the RS is only placed at the DL transmission boundary, the aggressor gNB may not be able to recognize itself aggressor, and the RI would not be mitigated.

Figure 21:
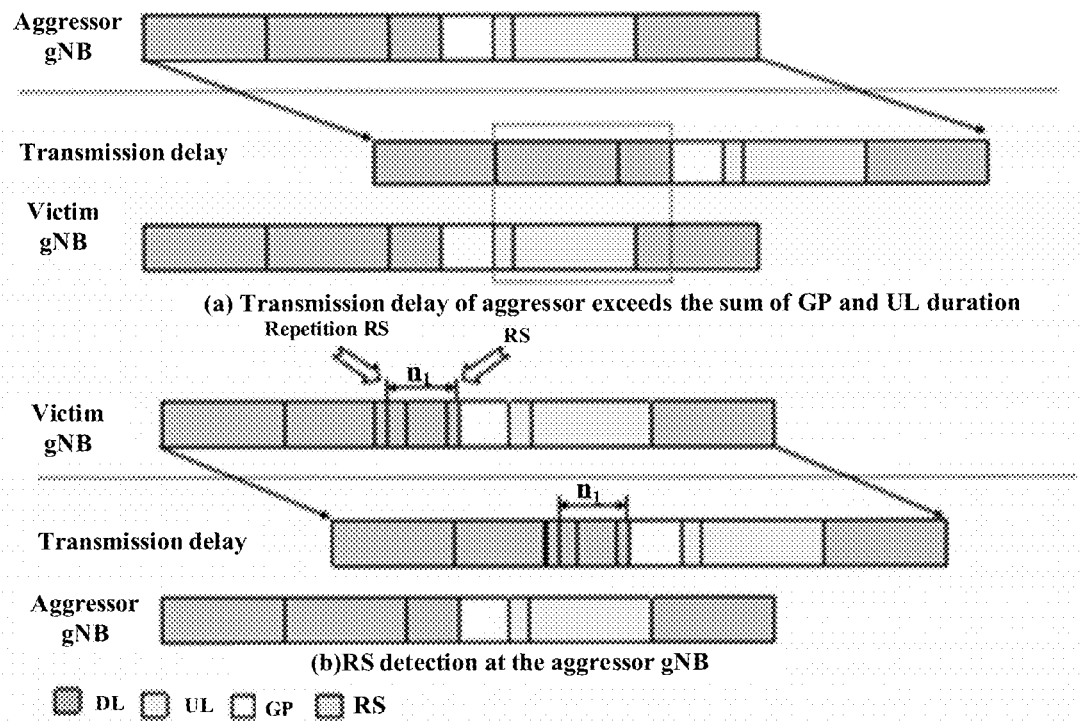
FIG. 21 shows an example of Repeat RIM-RS before the boundary when transmission delay exceeds the sum of GP and UL duration.

FIG. 21 Repeat RIM-RS before the boundary when transmission delay exceeds the sum of GP and UL duration To solve that problem, the RS could be repeated before the DL transmission boundary, at it is shown in FIG. 21. Even the RS before the boundary arrives at the DL duration and cannot be detected, the repetition RS is detectable. The aggressor gNB could infer how many UL symbols it interferes, e.g. $n_2$ in FIG. 21(*b*). With the knowledge of the interval between the repetition RS and the boundary, e.g. $n_1$ in FIG. 21(*b*), the gNB would finally deduce that there are $n_1+n_2$ symbols interfered at the victim gNB and it should reserve $n_1+n_2$ DL symbols as GP. As to the position of repetition RS, 1) it could be properly configured according to the prior experience, or 2) it could be encoded into the ID information, or 3) it could be indicated in the backhaul signaling.

Figure 22:
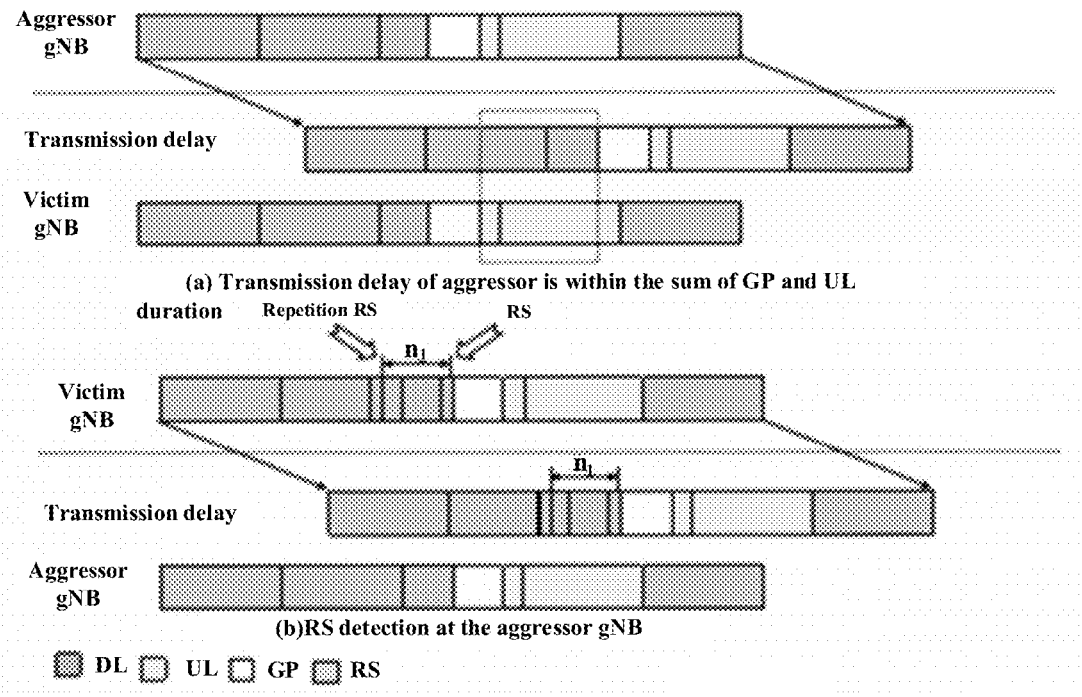
FIG. 22 shows an example of Repeat RIM-RS before the boundary when transmission delay is within the sum of GP and UL duration.

FIG. 22 Repeat RIM-RS before the boundary when transmission delay is within the sum of GP and UL duration.

For the case that transmission delay is within the sum of GP and UL duration, which is shown in FIG. 22. If the RIM-RS is repetitively transmitted, the aggressor would detect two same RS within a transition periodicity. It would be clear to aggressor that only UL symbols are interfered, and the interfered range could be reduced by the position of the RS is detected.

In FIG. 22, it seems that the repeated RS is not necessary. To reduce the detection complexity, the gNB may not need to repetitively transmit the RS. The range of remote interference and the necessity of RIM-RS could be inferred from the prior experience. If the transmission delay is beyond the sum of GP and UL duration, the repetition RS should be transmitted. Otherwise, the repetition RS could be omitted. And existence of repetition RS should be informed across the macro cells within the network.

Observation 8: Repeating RS before the DL transmission boundary is necessary if the transmission delay exceeds the sum of GP and UL duration.

Proposal 10: If the transmission delay exceed the sum of GP and UL duration, the repetition RS should be transmitted. Otherwise, the repetition RS could be omitted. And existence of repetition RS should be informed across the macro cells within the network.

Proposal 11: The position of repetition RS could be 1) properly configured according to the prior experience, or 2) encoded into the ID information, or 3) indicated in the backhaul signaling.

B6. Concluding Remarks for Preceding Sections

In this contribution, we discuss the reference signal design for remote interference management and have the following observations and proposals:

Observation 1: Comb-like structure with one symbol RS may be not robust enough to meet the requirements.

Observation 2: The Alt-2 RIM-RS could reuse the FFT as PDSCH signal generation.

Observation 3: Considering the RIM-RS transmission periodicity, the additional overhead of two-symbol RS is small.

Observation 4: RIM-RS transmission pattern depends on the ID length, RS transmission periodicity and UL-DL transition periodicity.

Observation 5: If the position of RS-2 is backoff as the DL symbol, it may be undetectable at the victim gNB side.

Observation 6: The interference would not accumulate and cause a strong impact at the victim gNB even the RS-2 is placed as the last symbols before the DL transmission boundary.

Observation 7: In NR, if the RS is only placed at the DL transmission boundary, the aggressor gNB may not be able to recognize itself aggressor, and the RI would not be mitigated.

Observation 8: Repeating RS before the DL transmission boundary is necessary if the transmission delay exceeds the sum of GP and UL duration.

Proposal 1: The design of reference signals in RIM should consider the following factors: performance, overhead, compatibility, detectable without symbol alignment.

Proposal 2: The reference signals in RIM should have the following functionalities: convey gNB ID or gNB set ID and assist the aggressor gNB to identity how many uplink symbols of victim are affected.

Proposal 3: Two-symbol RS, where two copies of the RS sequence are concatenated and one CP is attached at the beginning the concatenated sequences could be used as the RIM-RS.

Proposal 4: The number of sequences to generate RIM-RS should be limited, for example, to be eight.

Proposal 5: To enhance the detection performance and robustness of RIM-RS, there are two methods that could be used a) repeating RIM-RS within a transmission periodicity, b) repeating RIM-RS within an occasion. Furthermore, the repetition factor should be configurable.

Proposal 6: If the ID information is obtained by combining different transmission occasions, the possible combinations used to convey ID should be limited to reduce the ambiguity.

Proposal 7: To reduce the blind detection complexity, the position of RIM-RS in frequency domain should be fixed.

Proposal 8: If both the RS-1 and RS-2 are necessary in Framework-1, they should be distinguished by TDM.

Proposal 9: Same as RS-1, RS-2 in Framework-1 should be placed at the last symbols before the DL transmission boundary.

Proposal 10: If the transmission delay exceed the sum of GP and UL duration the repetition RS should be transmitted. Otherwise, the repetition RS could be omitted. And existence of repetition RS should be informed across the macro cells within the network.

Proposal 11: The position of repetition RS could be 1) properly configured according to the prior experience, or 2) encoded into the ID information, or 3) indicated in the backhaul signaling.

Various example implementations can be described using the following clause-based format.

1. A wireless communication method, comprising: receiving, at a first communication node, interference status information indicative of a remote interference between the first communication node and a second communication node; and performing, by the first communication node, subsequent communications to the second communication node by implementing a backoff based on a granularity.

2. The method of clause 1, comprising: receiving, at the first communication node, a first reference signal from the second communication node indicating the remote interference.

3. The method of clause 2, wherein the reference signal carries a first identifier of the second communication node.

4. The method of any of clauses 1 to 3, wherein the first communication node and the second communication agree to operate using a maximum downlink transmission boundary and a maximum uplink transmission boundary within a downlink-uplink switching period. For example, FIG. 3 and related description provides time domain examples.

5. The method of clause 1, wherein the backoff includes backing off transmission power according to a power granularity, or refraining from transmitting on a number of symbols according to a symbol granularity between a last downlink symbol configured by the second communication node and the maximum downlink transmission boundary, or a second time-domain distance between a first uplink symbol configured by the second communication node and the maximum uplink transmission boundary.

6. The method of any of clauses 1 to 5, wherein the interference cancellation status information includes one or more of an ACK, a NACK, a dB value, a symbol count, a backoff time and an indication of the remote interference received at the second communication node.

7. The method of any of clauses 1 to 6, wherein the first communication node adjusts the granularity based on a message from the second communication node.

8. The method of any of clauses 1 to 7, wherein the information is received via an air interface or a backhaul signaling message.

9. The method of any of clauses 1 to 8, wherein performing the subsequent communications includes: performing, by the first communication node, an interference mitigation scheme based on the information.

10. The method of clause 9, comprising: terminating, by the first communication node, the mitigation scheme.

11. The method of clause 9 or 10, wherein performing the mitigation scheme comprises: transmitting, by the first communication node, a second reference signal based on a parameter, wherein the parameter indicates that the second reference signal is transmitted for indicating whether an atmospheric ducting phenomenon persists.

12. A method of wireless communication, comprising: transmitting, by a first communication node, a first reference signal indicative of presence of remote interference between the first communication node and a second communication node, wherein time domain positions of the first reference signal includes one of a last symbol before a maximum downlink transmission boundary for transmissions between the first communication node and the second communication node, or an Nth symbol prior to the transmission boundary, where N is an integer greater than 1.

13. The method of clause 12, wherein N is a function of at least one of the following parameters: subcarrier spacing, a transmission distance between the first communication node and the second communication node, a transmission delay between the first communication node and the second communication node, or a number of flexible symbols after the maximum downlink transmission boundary.

14. The method of any of clauses 12 to 13, wherein N is semi-persistently scheduled for the first communication node.

15. A method of wireless communication, comprising: transmitting, by a first communication node, a first reference signal indicative of presence of remote interference between the first communication node and a second communication node, wherein the first reference signal is transmitted in preconfigured time periods and wherein the first reference signal is transmitted at multiple occasions in each time period; and communicating an ID information associated with the first communication node using the first reference signal.

16. The method of clause 15 wherein the ID information associated with the first communication node is an identifier of the first communication node or an identifier of a set to which the first communication node belongs.

17. The method of clause 15 or 16, wherein transmissions of the first reference signal in occasions in a given time period all carry a same subset of bits of the ID information.

18. The method of clause 15 or 16, wherein transmissions of the first reference signal include N successive bits of the ID information, where N is an integer.

19. The method of clause 15 or 16, wherein the ID information is communicated in bit portions, wherein each bit portion having a size M is transmitted in M successive transmissions of the first reference signal, where M is an integer.

20. The method of clause 15 or 16, wherein the preconfigured time periods include at least a first time period P1 and a second time period P2 and wherein different portions of the identifier are transmitted in transmissions during P1 and P2.

21. A method of wireless communication comprising: transmitting, from a first communication node, a first reference signal related to a first interference on an inbound channel to the first communication node and a second reference signal related to a second interference on an outbound channel from the first communication node, wherein the first reference signal and the second reference signal are transmitted in a non-overlapping manner.

22. The method of clause 21, wherein the non-overlapping manner includes a dual cycle manner comprising a first cycle in which the first reference signal is transmitted and a second cycle that is non-overlapping with the first cycle in which the second reference signal is transmitted.

23. The method of clause 21-22, wherein a first period of the first cycle and a second period of the second cycle are configured via a high layer message.

24. The method of any of clauses 21 to 23, wherein the first cycle and the second cycle have durations that are different.

25. The method of clause 24, wherein one of the first cycle and the second cycle is repeated more often than the other of the first cycle and the second cycle.

26. The method of clause 21, wherein the non-overlapping manner includes periodically sending the first reference and the second reference signal beginning at different offsets in each period.

27. The method of clause 21, wherein the first reference signal and the second reference signal have different transmission densities in the first cycle and the second cycle, respectively.

28. A wireless communication apparatus, comprising a processor configured to implement a method recited in any one or more of clauses 1 to 27.

29. A computer program product having code stored thereon, the code, when executed by a processor, causing the processor to implement a method recited in any one or more of clauses 1 to 27.

It will be appreciated that the present document discloses techniques that can be embodied into wireless communication systems to allow the wireless communication nodes to effectively mitigate remote interferences without noticeable impact on the system performance.

The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A method of wireless communication, comprising:
receiving, by a second communication node, a first reference signal that includes an interference status information about remote interference between a first communication node and the second communication node,
wherein the first reference signal is received in preconfigured time periods,
wherein the first reference signal is received at multiple occasions in each preconfigured time period,
wherein receptions of the first reference signal in the multiple occasions carry an ID information of the first communication node,
wherein the ID information is a same ID information in each of the multiple occasions,
wherein the ID information is an identifier of a set to which the first communication node belongs,
wherein the second communication node performs no further interference mitigation action in response to the interference status information including a first message, or the second communication node further performs interference cancellation in response to the interference status information including a second message, and
wherein each occasion of the multiple occasions corresponds to a periodicity of transition between uplink and downlink communications of the first communication node.

2. The method of claim 1, wherein the first reference signal is a remote interference management reference signal (RIM-RS).

3. An apparatus comprising: at least one processor and memory containing instructions that when executed perform operations comprising:
receiving, by a second communication node, a first reference signal that includes an interference status information about remote interference between a first communication node and the second communication node,
wherein the first reference signal is received in preconfigured time periods,
wherein the first reference signal is received at multiple occasions in each preconfigured time period,
wherein receptions of the first reference signal in the multiple occasions carry an ID information of the first communication node,
wherein the ID information is a same ID information in each of the multiple occasions,
wherein the ID information is an identifier of a set to which the first communication node belongs,
wherein the second communication node performs no further interference mitigation action in response to the interference status information including a first message, or the second communication node further performs interference cancellation in response to the interference status information including a second message, and wherein each occasion of the multiple occasions corresponds to a periodicity of transition between uplink and downlink communications of the first communication node.

4. The apparatus of claim 3, wherein the first reference signal is a remote interference management reference signal (RIM-RS).

5. A non-transitory computer program product having code stored thereon, the code, when executed by a processor, causing the processor to implement a method, comprising:

receiving, by a second communication node, a first reference signal that includes an interference status information about remote interference between a first communication node and the second communication node, wherein the first reference signal is received in preconfigured time periods, wherein the first reference signal is received at multiple occasions in each preconfigured time period, wherein receptions of the first reference signal in the multiple occasions carry an ID information of the first communication node, wherein the ID information is a same ID information in each of the multiple occasions, wherein the ID information is an identifier of a set to which the first communication node belongs, wherein the second communication node performs no further interference mitigation action in response to the interference status information including a first message, or the second communication node further performs interference cancellation in response to the interference status information including a second message, and wherein each occasion of the multiple occasions corresponds to a periodicity of transition between uplink and downlink communications of the first communication node.

6. The non-transitory computer program product of claim 5, wherein the first reference signal is a remote interference management reference signal (RIM-RS).

* * * * *